US010084564B2

United States Patent
Lim et al.

(10) Patent No.: US 10,084,564 B2
(45) Date of Patent: Sep. 25, 2018

(54) METHOD FOR TRANSMITTING SUPPORT INFORMATION FOR REMOVING INTERFERENCE OF TERMINAL, AND SERVING CELL BASE STATION

(71) Applicant: LG ELECTRONICS INC., Seoul (KR)

(72) Inventors: Suhwan Lim, Seoul (KR); Sangwook Lee, Seoul (KR); Jinyup Hwang, Seoul (KR); Manyoung Jung, Seoul (KR); Yoonoh Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 14/760,950

(22) PCT Filed: Feb. 7, 2014

(86) PCT No.: PCT/KR2014/001062
§ 371 (c)(1),
(2) Date: Jul. 14, 2015

(87) PCT Pub. No.: WO2014/123387
PCT Pub. Date: Aug. 14, 2014

(65) Prior Publication Data
US 2015/0372779 A1    Dec. 24, 2015

Related U.S. Application Data

(60) Provisional application No. 61/762,331, filed on Feb. 8, 2013.

(51) Int. Cl.
*H04J 11/00* (2006.01)
*H04L 5/00* (2006.01)
*H04W 56/00* (2009.01)

(52) U.S. Cl.
CPC .......... *H04J 11/005* (2013.01); *H04L 5/0053* (2013.01); *H04W 56/003* (2013.01); *H04L 5/001* (2013.01)

(58) Field of Classification Search
CPC . H04W 72/082; H04W 56/00; H04W 72/005; H04W 72/0446; H04W 48/12;
(Continued)

(56) References Cited

U.S. PATENT DOCUMENTS

2009/0086861 A1* 4/2009 Yavuz ................. H04W 52/367
375/346
2011/0194527 A1* 8/2011 Lin ....................... H04B 7/022
370/330
(Continued)

FOREIGN PATENT DOCUMENTS

KR  10-2011-0046231 A  5/2011
KR  10-2011-0098592 A  9/2011
(Continued)

*Primary Examiner* — Edan Orgad
*Assistant Examiner* — Nourali Mansoury
(74) *Attorney, Agent, or Firm* — Birch, Stewart, Kolasch & Birch, LLP

(57) ABSTRACT

One embodiment of the present specification discloses a method by which a serving cell transmits support information for removing interference of a terminal. The method comprises: a step for determining, by the serving cell, a downlink timing offset with neighboring interference cells; and a step for to determining, by the serving cell, a channel corresponding to an interference removal target among neighboring interference cells according to the timing offset. Here, the channel to have interference removed can be the channel interfering in a control channel for the serving cell according to the timing offset. The method further includes a step for enabling the serving cell to generate the interfer- (Continued)

ence removal support information on the determined channel and transmit the generated information to a terminal.

13 Claims, 25 Drawing Sheets

(58) Field of Classification Search
 CPC ............ H04W 28/12; H04W 36/0088; H04W 52/244; H04L 5/0092; H04L 5/0073; H04L 5/0053; H04B 1/10; H04B 15/00; H04B 7/04; H04J 11/005
 See application file for complete search history.

(56) References Cited

U.S. PATENT DOCUMENTS

| | | | |
|---|---|---|---|
| 2011/0267937 A1 | 11/2011 | Yoo et al. | |
| 2012/0003981 A1* | 1/2012 | Krishnamurthy | H04W 24/10 |
| | | | 455/450 |
| 2012/0093076 A1* | 4/2012 | Zhang | H04J 11/005 |
| | | | 370/328 |
| 2012/0113843 A1* | 5/2012 | Watfa | H04W 72/1289 |
| | | | 370/252 |
| 2012/0190391 A1* | 7/2012 | Yoo | H04J 11/005 |
| | | | 455/501 |
| 2012/0201162 A1 | 8/2012 | Kim et al. | |
| 2012/0258724 A1 | 10/2012 | Kim et al. | |
| 2012/0322492 A1 | 12/2012 | Koo et al. | |
| 2013/0215785 A1 | 8/2013 | Jung et al. | |
| 2015/0195057 A1* | 7/2015 | Tan | H04J 11/005 |
| | | | 370/252 |
| 2015/0195070 A1* | 7/2015 | Kim | H04L 1/0027 |
| | | | 370/329 |

FOREIGN PATENT DOCUMENTS

| | | |
|---|---|---|
| KR | 10-2013-0009860 A | 1/2013 |
| WO | WO 2011/074865 A2 | 6/2011 |
| WO | WO 2012/060602 A2 | 5/2012 |

\* cited by examiner

METHOD FOR TRANSMITTING SUPPORT INFORMATION FOR REMOVING INTERFERENCE OF TERMINAL, AND SERVING CELL BASE STATION

CROSS REFERENCE TO RELATED APPLICATIONS

This application is the National Phase of PCT International Application No. PCT/KR2014/001062, filed on Feb. 7, 2014, which claims priority under 35 U.S.C. 119(e) to U.S. Provisional Application No. 61/762,331, filed on Feb. 8, 2013, all of which are hereby expressly incorporated by reference into the present application.

BACKGROUND OF THE INVENTION

Field of the Invention

A disclosure of the present specification relates to a method for transmitting assistance information and a serving cell base station.

Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

Recently, the development of 3GPP LTE-advanced (LTE-A), which is an evolution of 3GPP LTE, has been being completed.

In addition, recently, there is ongoing discussion on a heterogeneous network in which a macro cell and a small-scale cell co-exist. In particular, there is an ongoing discussion for offloading traffic by distributing terminals having access to the macro cell to the small-scale cell.

Meanwhile, due to the small-scale cell, interference may be increased more, and according to this, interference cancellation function is desperately needed.

SUMMARY OF THE INVENTION

Accordingly, in an aspect, an object of a disclosure of the present specification is to solve the problems.

To achieve the above objects, the present disclosure provides a method for transmitting assistance information for interference cancellation for a user equipment. The method may comprise: determining, by a serving cell, a downlink timing offset with a neighbor interfering cell; determining, by the serving cell, a channel which is to be a target of interference cancellation among channels of the neighbor interfering cell according to the timing offset, wherein the channel which is the target of interference cancellation is a channel that exerts interference to a control channel of the serving cell; and generating, by the serving cell, interference cancellation assistance information for the determined channel, and transmit the interference cancellation assistance information to the user equipment.

The control channel may include at least one of a Physical Downlink Control Channel (PDCCH), a Physical Control Format Indicator Channel (PCFICH) and a Physical Hybrid-ARQ Indicator Channel (PHICH).

The determining of the offset may include exchanging, performed by the serving cell, information on the downlink timing offset with the neighbor interfering cell.

The generating of the interference cancellation assistance information may include: acquiring, by the serving cell, information on the determined channel from the neighbor interfering cell; and generating the interference cancellation assistance information based on the acquired information.

If the timing offset is zero or a unit of subframe, the target of interference cancellation the control channel of the neighbor interfering cell that exerts interference to the control channel of the serving cell.

If the timing offset corresponds to five to six symbols and the control channel of the serving cell is transmitted on two symbols, the target of interference cancellation is at least one of a Primary Synchronization Signal (PSS), a Secondary Synchronization Signal (SSS), an extended Physical Downlink Control Channel (e-PDCCH) and a Physical Downlink Shared Channel (PDSCH) of the neighbor interfering cell that exerts interference to the control channel of the serving cell.

If the timing offset corresponds to seven to ten symbols and the control channel of the serving cell is transmitted on two symbols, the target of interference cancellation is at least one of a PBCH, an e-PDCCH and a PDSCH of the neighbor interfering cell that exerts interference to the control channel of the serving cell.

The interference cancellation assistance information includes information required in common regardless of the sort of channel which is a target of interference cancellation and information dedicated to the channel which is a target of interference cancellation.

If the target of interference cancellation is the control channel of the neighbor interfering cell, the information dedicated to the channel includes information on common search space for a neighbor user equipment that belongs to the neighbor interfering cell.

To achieve the above objects, the present disclosure provides a serving base station for transmitting assistance information for interference cancellation for a user equipment. The serving base station may comprise: a processor configured to determine a downlink timing offset with a neighbor interfering cell and determine a channel which is to be a target of interference cancellation among channels of the neighbor interfering cell according to the timing offset, wherein the channel which is a target of interference cancellation is a channel that exerts interference to a control channel of the serving cell; and an RF unit configured to transmit the interference cancellation assistance information for the determined channel to the user equipment.

Advantageous Effects

A disclosure of the present specification is objected to remove the influence caused by neighboring user equipment with an aide of a serving cell at the user equipment by providing resources allocated by the serving cell to the corresponding user equipment such that the user equipment effectively removes the interference. Accordingly, the user equipment may increase the reception performance through the interference cancellation function.

BRIEF DESCRIPTION OF THE DRAWINGS

FIG. 15b is a block diagram illustrating operations of the interference cancellation unit shown in FIG. 15a.

DESCRIPTION OF EXEMPLARY EMBODIMENTS

Figure 1:
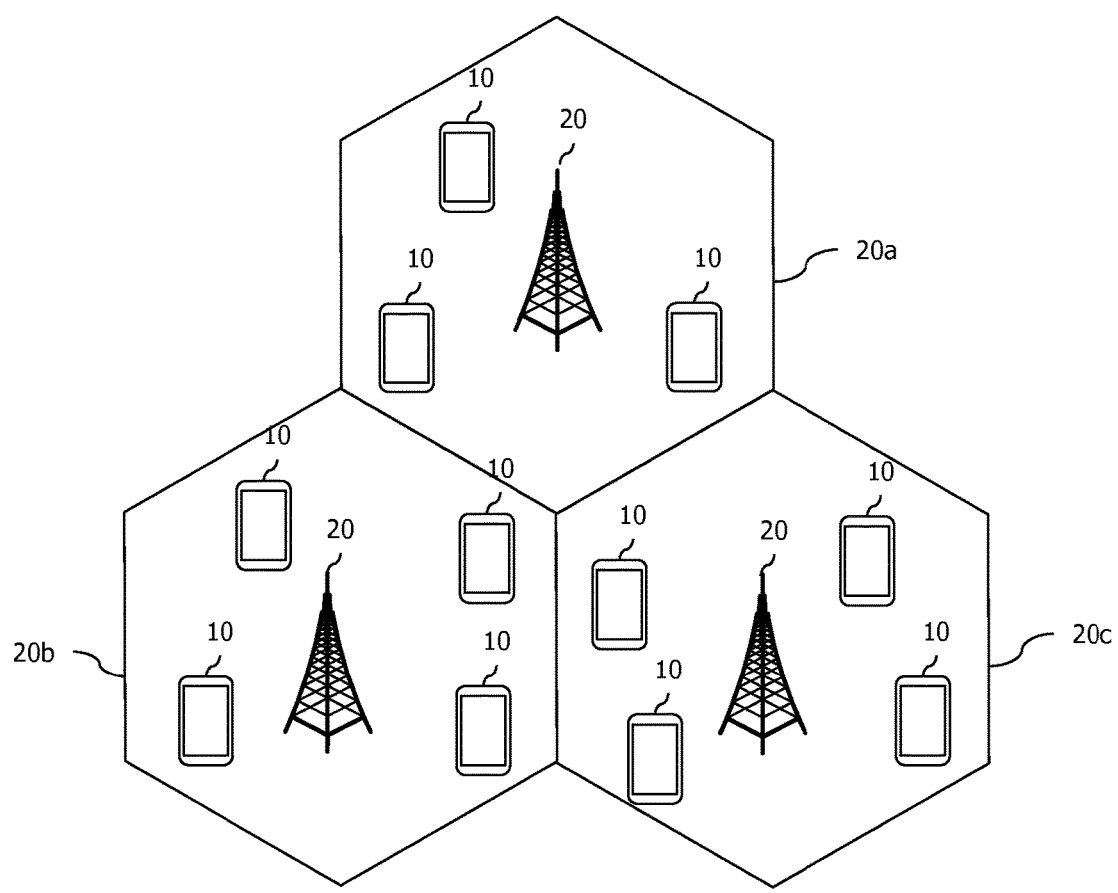
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20*a*, 20*b*, and 20*c* (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
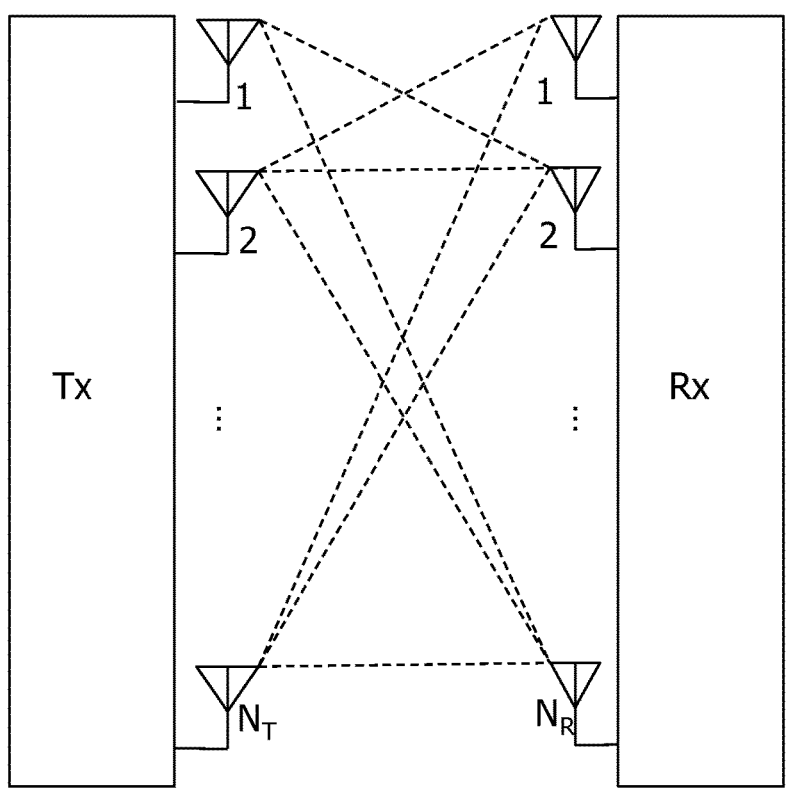
FIG. 2 illustrates a general multiple antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below.

$$R_i = \min(N_T, N_R) \quad \text{[Equation 1]}$$

The transmission information may include up to NT different pieces of information when the number of transmission antennas is NT. In this case, the transmission information may be represented as in Equation 2.

$$s = [s_1, s_2, \ldots, s_{N_T}]^T \quad \text{[Equation 2]}$$

In Equation 2, s refers to a transmission information vector, and s1, s2, . . . , sNT represent the respective elements of transmission information vectors. Each information may be transmitted having a different transmission power. When the respective transmission powers are represented as (P1, P2, . . . , PNT), a transmission information vector to which a transmission power is applied may be represented as in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Equation 3 may be represented as the product of a transmission power diagonal matrix and a transmission information vector as in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Transmission signals (x1, x2, . . . , xNT) that are actually transmitted through NT transmission antennas are generated by multiplying a transmission information vectors ŝ to which transmission power is applied by a weight matrix W. The weight matrix W functions to properly distribute transmission informations to individual antennas depending on transmission channel conditions. Assuming that a transmission signal vector is x, the following equation may be obtained.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, an element in the weight matrix, wij (1≤i≤NT, 1≤j≤NT), represents a weight for an ith transmission antenna and a jth transmission information. The weight matrix W is also denoted a precoding matrix.

A transmission signal vector may include different transmission informations depending on transmission schemes. For example, when spatial diversity, i.e., transmission diversity, applies, transmission informations of the transmission signal vectors may be all the same. That is, [s1, s2, . . . , snT] may be all the same information, e.g., [s1, s1, . . . , s1]. Accordingly, since the same transmission informations are transferred to the receiver through different channels, a diversity effect occurs, and the transmission may be more reliable.

Or, when spatial multiplexing applies, the transmission informations of the transmission signal vectors may be different. That is, s1, s2, . . . , snT may be all different. Since different transmission informations are transmitted to the receiver through different channels, the amount of information to be transmitted may be increased.

Of course, transmission informations may be transmitted using both spatial diversity and spatial multiplexing. That is, in the above example, the same informations may be transmitted by spatial diversity through three transmission antennas, and different informations may be transmitted through spatial multiplexing through the remaining transmission antennas. In such case, the transmission information vectors may be configured as, e.g., [s1, s1, s1, s2, s3 . . . , snT−2].

When the receiver has NR reception antennas, a signal received by an individual reception antenna may be represented as yn(1≤n≤NR). In this case, a reception signal vector y may be represented as in the following equation.

$$y = [y_1, y_2, \ldots, y_{N_R}]^T \quad \text{[Equation 6]}$$

When channel modeling is performed in a MIMO system, each channel may be differentiated from another by an index of a transmission antenna and an index of a reception antenna. When the index of the transmission antenna is j, and the index of the reception antenna is i, the channel between the transmission antenna and the reception antenna may be represented as hij. (it should be noted that the index of the reception antenna comes before the index of the transmission antenna in the subscript indicating the channel).

Figure 3:
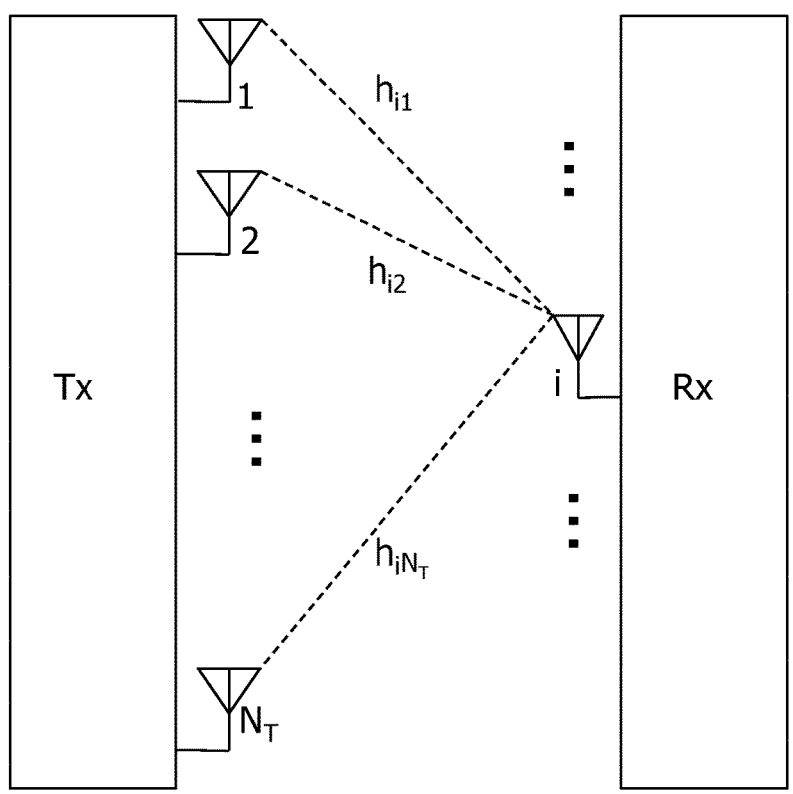
FIG. 3 illustrates an example of a channel in a multi-antenna system.

FIG. 3 illustrates an example of a channel in a multi-antenna system.

Referring to FIG. 3, channels for NT transmission antennas and reception antenna I are represented as hi1, hi2, . . . , hiNT. For convenience, such channels may be represented in a matrix or vector. Then, the channels hi1, hi2, . . . , hiNT, may be represented in a vector form as follows.

$$h_i^T = [h_{i1}, h_{i2}, \ldots, h_{iN_T}]^T \quad \text{[Equation 7]}$$

When a matrix representing all the channels to NR in NT transmission antennas is channel matrix H, H may be represented as in Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

A signal transmitted through a transmission antenna passes through a channel as represented in Equation 8 and is then received by a reception antenna. In this case, the actual channel adds noise. The noise may be mathematically deemed an AWGN (Additive White Gaussian Noise). When AWGNs added to the reception antennas, respectively, are represented as n1, n2, . . . , nNR, the AWGNs may be represented as a vector as in the following equation.

$$n = [n_1, n_2, \ldots, n_{N_R}]^T \quad \text{[Equation 9]}$$

A reception signal vector y received by a reception antenna considering the above-described AWGN, transmission signal vector x, and channel matrix may be represented as in the following equation.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \quad \text{[Equation 10]}$$

$$\begin{bmatrix} n_1 \\ n_2 \\ \vdots \\ n_i \\ \vdots \\ n_{N_R} \end{bmatrix} = Hx + n$$

The numbers of rows and columns in the channel matrix H are determined depending on the numbers of transmission antennas and reception antennas. The number of rows in the channel matrix H is the same as the number of reception antennas. The number of columns in the channel matrix H is the same as the number of transmission antennas. Accordingly, the channel matrix H may be represented as a NR×NT matrix.

Generally, a rank of a matrix is defined by the smaller of the number of independent rows and the number of independent columns. Accordingly, the rank of matrix cannot be larger than the number of rows or the number of columns, and the rank of channel matrix H is determined as in the following equation.

$$\text{rank}(H) \leq \min(N_T, N_R) \quad \text{[Equation 11]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 4:
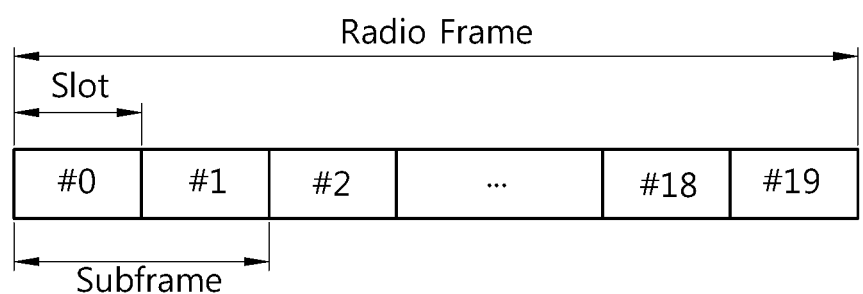
FIG. 4 illustrates the architecture of a radio frame according to FDD in 3GPP LTE.

FIG. 4 illustrates the architecture of a radio frame according to FDD in 3GPP LTE.

Referring to FIG. 4, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 5:
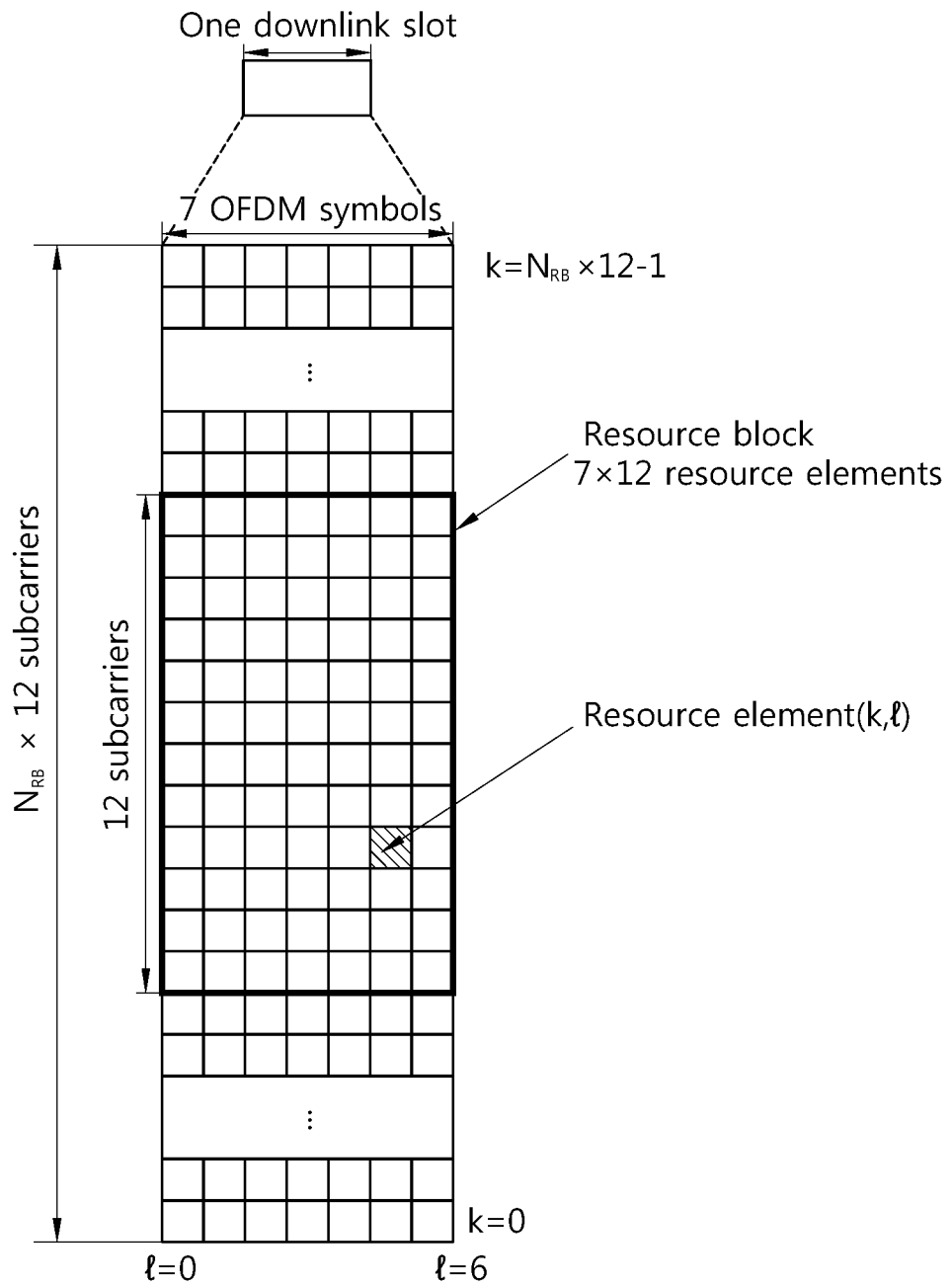
FIG. 5 illustrates an example resource grid for one uplink or downlink slot in 3GPP LTE.

FIG. 5 illustrates an example resource grid for one uplink or downlink slot in 3GPP LTE.

Referring to FIG. 5, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 6:
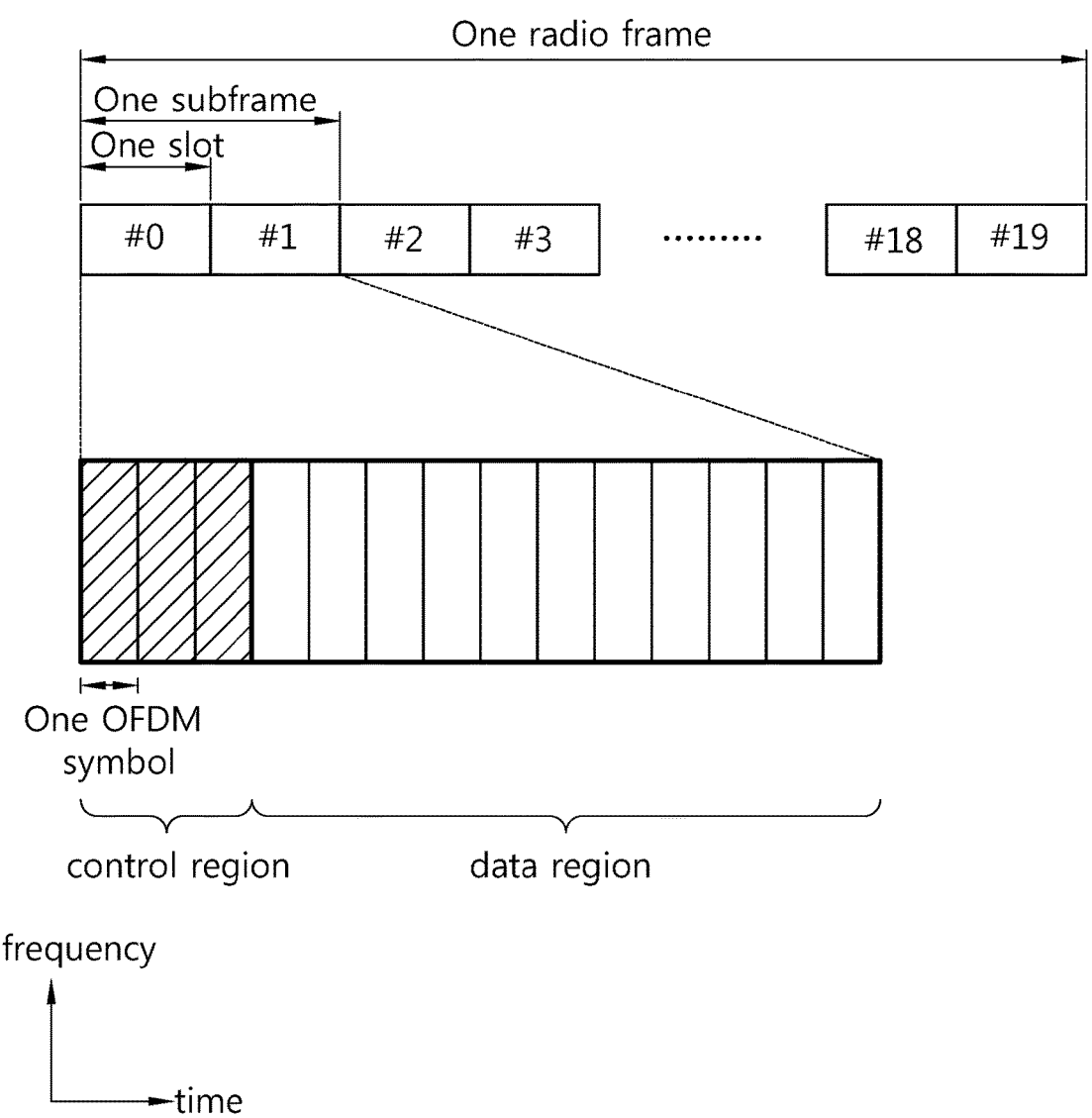
FIG. 6 illustrates the architecture of a downlink sub-frame.

FIG. 6 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 7:
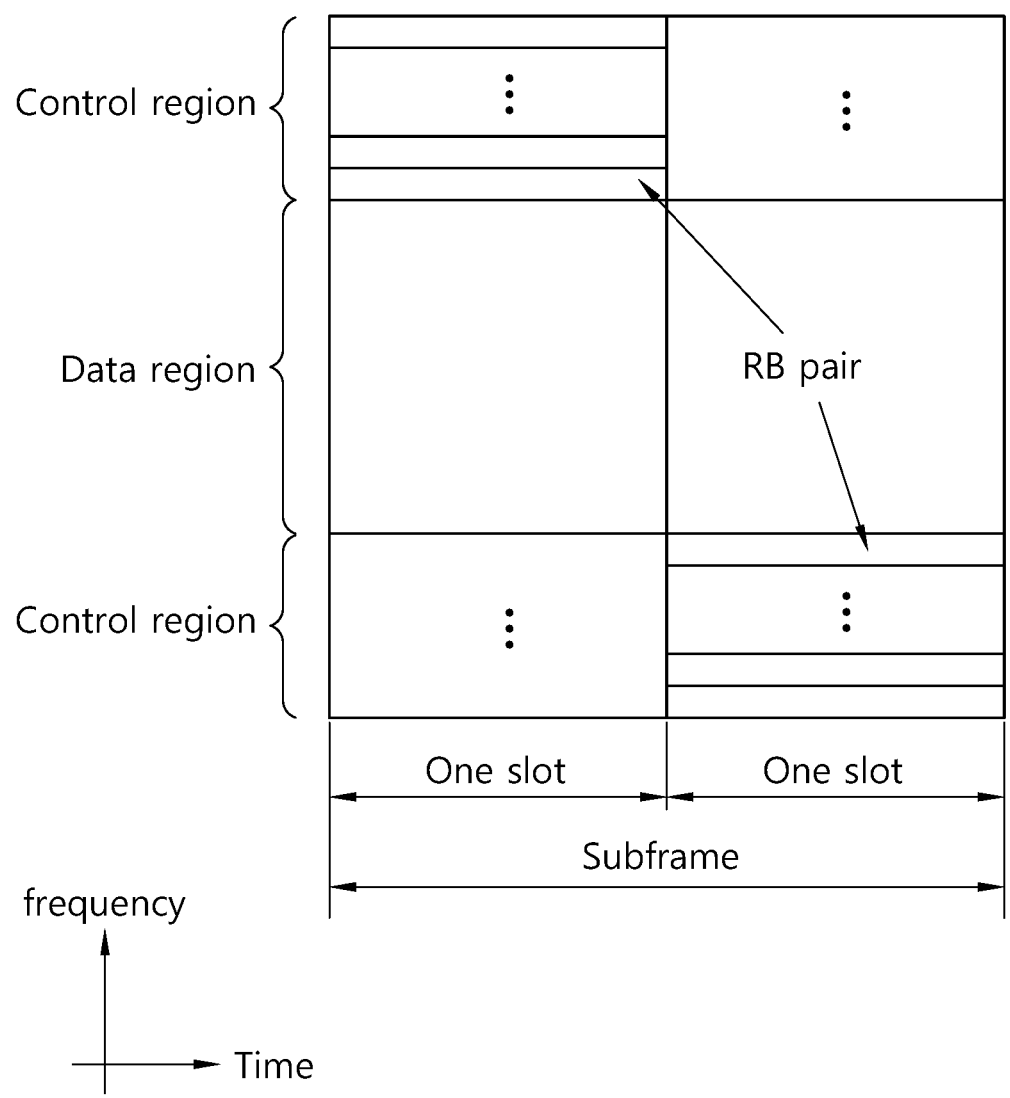
FIG. 7 illustrates the architecture of an uplink sub-frame in 3GPP LTE.

FIG. 7 illustrates the architecture of an uplink sub-frame in 3GPP LTE.

Referring to FIG. 7, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 8:
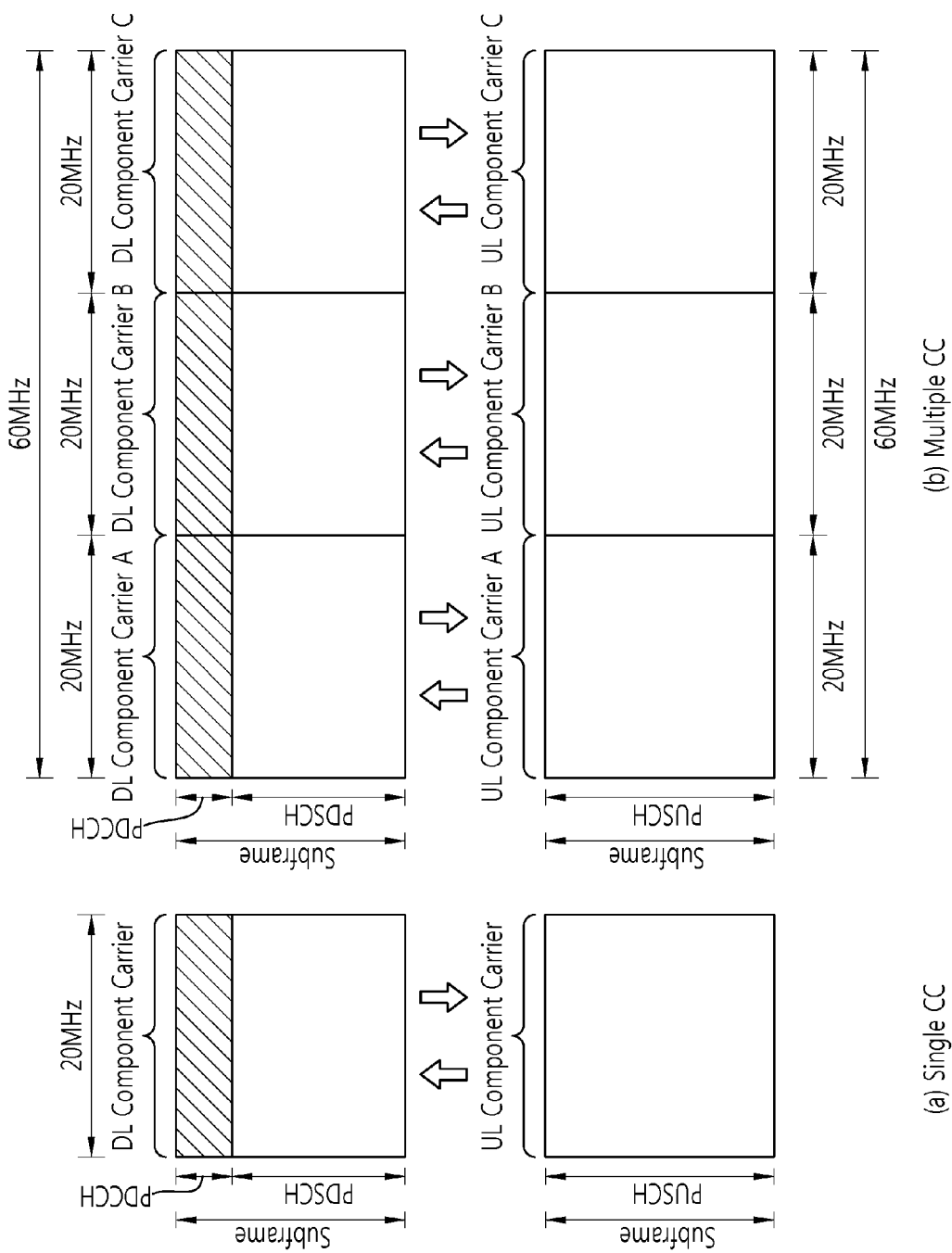
FIG. 8 illustrates an example of comparison between a single carrier system and a carrier aggregation system.

FIGS. 8a and 8b illustrate an example of comparison between a single carrier system and a carrier aggregation system.

Referring to FIG. 8a, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 8a, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 8b may correspond to a communication example in an LTE-A system.

Referring to FIG. 8b, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 8b illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz(UL CC1)+20 MHz(UL CC2)+20 MHz(UL CC3)+5 MHz(UL CC4), for example. However, without consideration of backward compatibility, a new bandwidth may be defined rather the existing system bandwidth being used, to constitute a broadband.

FIG. 8b illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Meanwhile, the reference signal is hereinafter described.

Generally, transmission information, e.g., data, may be prone to be distorted or varied while transmitted through a wireless channel. Accordingly, a reference signal is required to demodulate the transmission information without errors. The reference signal is a signal previously known between the transmitter and the receiver and is transmitted together with transmission information. Since transmission information transmitted from the transmitter goes through a channel corresponding to each transmission antenna or layer, the reference signal may be allocated per transmission antenna or layer. The reference signal per transmission antenna or layer may be differentiated using resources, such as time, frequency, or code. The reference signal may be used for two purposes, i.e., demodulation and channel estimation of transmission information.

There may be two types of reference signals depending on the category of a receiver previously aware of a reference signal. The first reference signal is a reference signal that is known to only a particular receiver (e.g., a particular UE) and such reference signal is denoted a dedicated RS (DRS). The dedicated reference signal, in such meaning, is also referred to as a UE-specific RS. The second reference signal is a reference signal that is known to all the receivers in a cell, e.g., all the UEs, and such reference signal is denoted a common RS (CRS). The CRS is also denoted a cell-specific RS.

Further, reference signals may be classified depending on uses. For example, a reference signal used for data demodulation is denoted a demodulation RS (DM-RS). A reference signal used for feedback information indicating a channel state, such as CQI/PMI/RI, is denoted a CSI-RS (channel state indicator-RS). The DRS may be used as a DM-RS. It is hereinafter assumed that the DM-RS is a DRS.

Figure 9A:
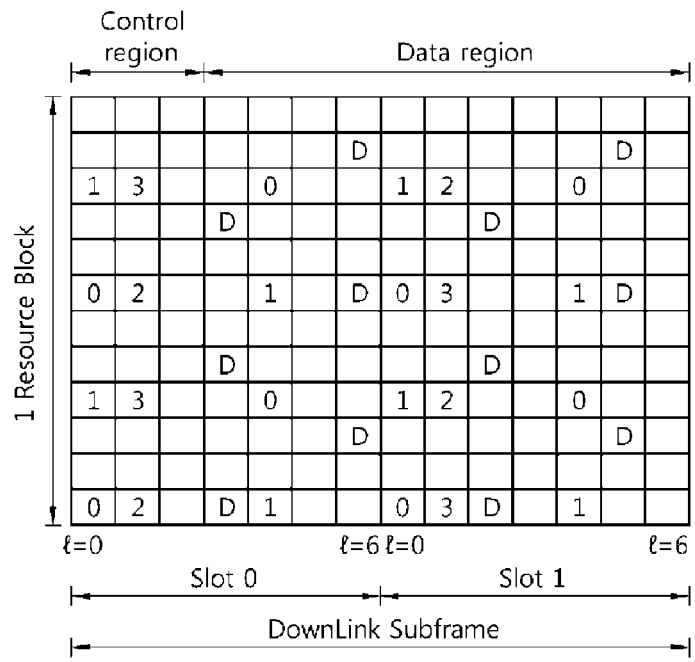
FIG. 9a illustrates an example of an RS structure that may support four antenna ports in normal CP.
Figure 9B:
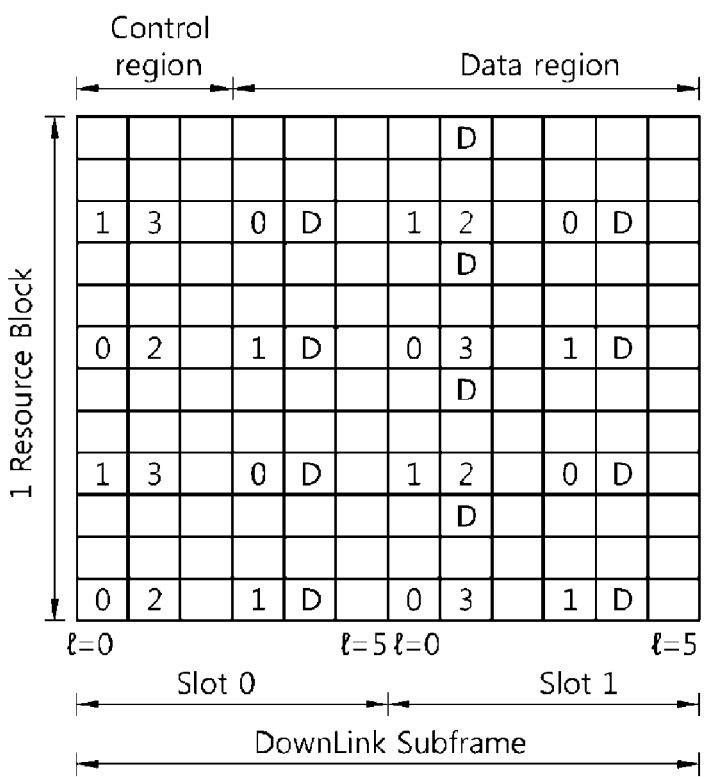
FIG. 9b illustrates an example of an RS structure that may support four antenna ports in extended CP.

FIG. 9a illustrates an example of an RS structure that may support four antenna ports in normal CP. FIG. 9b illustrates an example of an RS structure that may support four antenna ports in extended CP.

The RS structures of FIGS. 9a and 9b are RS structures used in a conventional 3GPP LTE system.

The resource element marked with one of 0 to 3 in FIGS. 9a and 9b denotes a resource element where a cell-specific reference signal, i.e., a common reference signal (CRS) is transmitted. Here, any one of 0 to 3 denotes a supported antenna port. That is, resource elements marked with p (p is any one of 0 to 3) mean resource elements to which a common reference signal for antenna port p is mapped. Such common reference signal is used to perform channel measurement and data demodulation on each antenna port. The common reference signal is transmitted in both the control region and the data region.

Resource elements marked with D in FIGS. 9a and 9b denote resource elements to which a UE-specific reference signal, i.e., a dedicated reference signal (DRS) is mapped. The UE-specific reference signal may be used single antenna port transmission of a PDSCH. The UE receives an indication as to whether a UE-specific reference signal is transmitted, and when a PDSCH is transmitted, whether the UE-specific reference signal is valid, through a higher layer signal. The UE-specific reference signal may be transmitted only when data demodulation is needed. The UE-specific reference signal may be transmitted only in the data region.

Figure 10:
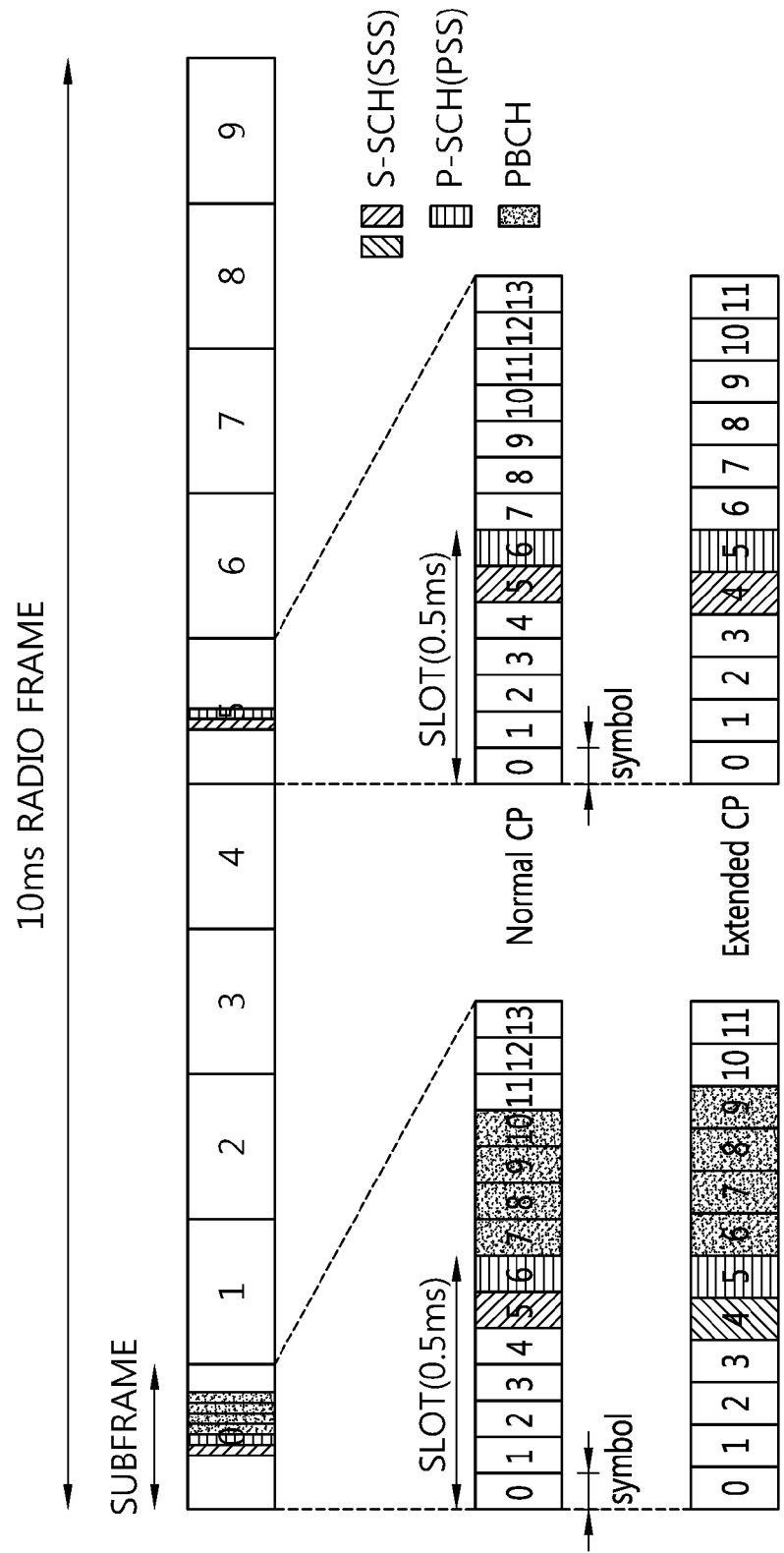
FIG. 10 illustrates a frame structure for transmitting a synchronization signal in a FDD frame defined in 3GPP LTE.

FIG. 10 illustrates a frame structure for transmitting a synchronization signal in a FDD frame defined in 3GPP LTE.

A slot number or a subframe number starts from zero. A UE may synchronize the time and frequency based on a synchronization signal received from a BS. The synchronization signal of 3GPP LTE-A is used for performing a cell search, and may be divided into a primary synchronization signal (PSS) and a secondary synchronization signal (SSS). For the synchronization signal of 3GPP LTE-A, section 6.11 of 3GPP TS V10.2.0 (2011-06) can be referred.

The PSS is used for acquiring OFDM symbol synchronization or slot synchronization, and is in relation to a physical-layer cell identity (PCI). And the SSS is used for acquiring frame synchronization. Also, the SSS is used for detecting a CP length and acquiring a physical-layer cell group ID.

The synchronization signal may be transmitted in subframe 0 and subframe 5 respectively in consideration of 4.6 ms, which is global system for mobile communication (GSM) frame length, in order to easily perform inter-RAT measurement, and the frame boundary may be detected through the SSS. In more detail, in the FDD system, the PSS is transmitted in the last OFDM symbol of 0th slot and 10th slot, and the SSS is transmitted in the OFDM symbol right ahead of the PSS.

The synchronization signal may transmit one of total 504 physical cell ID through the combination of 3 PSS and 168 SSS. A physical broadcast channel (PBCH) is transmitted in first 4 OFDM symbols of a first slot. The synchronization signal and the PBCH are transmitted within 6 RB in the middle of system bandwidth, and therefore, a UE may detect or decode regardless of the transmission bandwidth. The physical channel in which the PSS is transmitted is referred as P-SCH, and the physical channel in which the SSS is transmitted is referred to as S-SCH.

Figure 11:
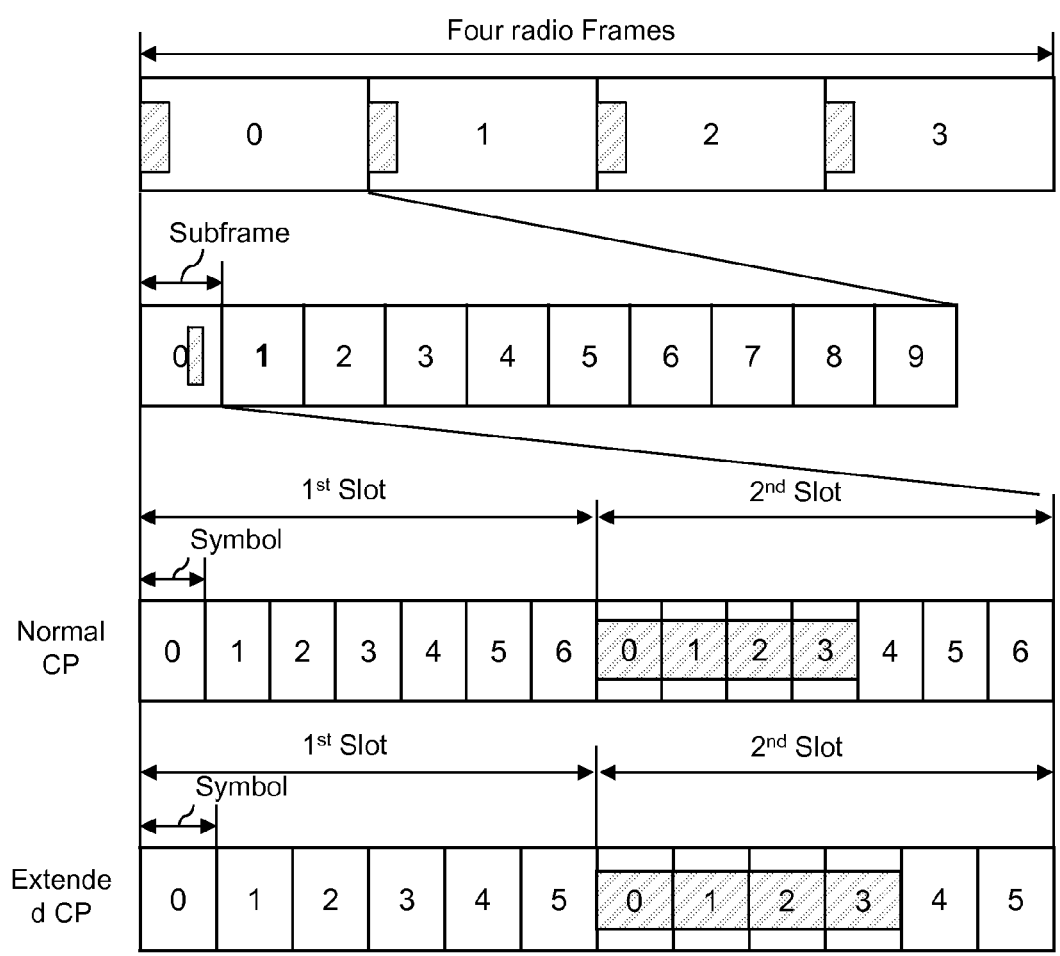
FIG. 11 illustrates a frame structure for a Physical Broadcast Channel (PBCH).

FIG. 11 illustrates a frame structure for a Physical Broadcast Channel (PBCH).

As shown in the drawing, a radio frame, a subframe and a symbol number are started from zero. The PBCH is transmitted in every radio frame, which is, transmitted at every 10 ms interval.

In addition, as shown in the drawing, the PBCH is transmitted on $0^{th}$ subframe on each radio frame. In more particular, the PBCH is transmitted on $0^{th}$, $1^{st}$, $3^{rd}$ and $4^{th}$ symbols of the second slot.

The PBCH is used for transmitting the Master Information Block (MIB) data, which is the most important data for the operation of system by each base station. Such MIB information is retransmitted with very low decoding rate in 10 ms cycle for 4 times such that all UEs access to the corresponding cell may receive the information reliably, thereby enabling to receive the MIB information even under very poor channel environment.

In the meanwhile, the MIB information of total 24 bits is defined in TS36.311 of current LTE standard as follows.

TABLE 1

```
-- ASN1START
MasterInformationBlock ::=   SEQUENCE {
    dl-Bandwidth                 ENUMERATED {
                                     n6, n15, n25, n50,
n75, n100},
    phich-Config                 PHICH-Config,
    systemFrameNumber            BIT STRING (SIZE (8)),
    spare                        BIT STRING (SIZE (10))
}
-- ASN1STOP
```

When transmitting the MIB information, generally, an identical data which is predetermined for the corresponding cell is transmitted except systemFrameNumber field. In case that change of the System Information Block (SIB) including the MIB is required for some reasons, it is notified to all UEs in the cell through separate Paging RRC signaling. Accordingly, the PBCH reception of UE is required only once when performing initial cell detection. Later, the existing information is maintained unless the Radio Resource Control (RRC) signaling denoting that the PBCH information of the serving cell is updated, and thus an additional reception procedure is not required.

In the meanwhile, recently, there is ongoing discussion on a heterogeneous network in which a macro cell and a small-scale cell co-exist. In particular, there is an ongoing discussion for offloading traffic by distributing terminals having access to the macro cell to the small-scale cell.

Figure 12:
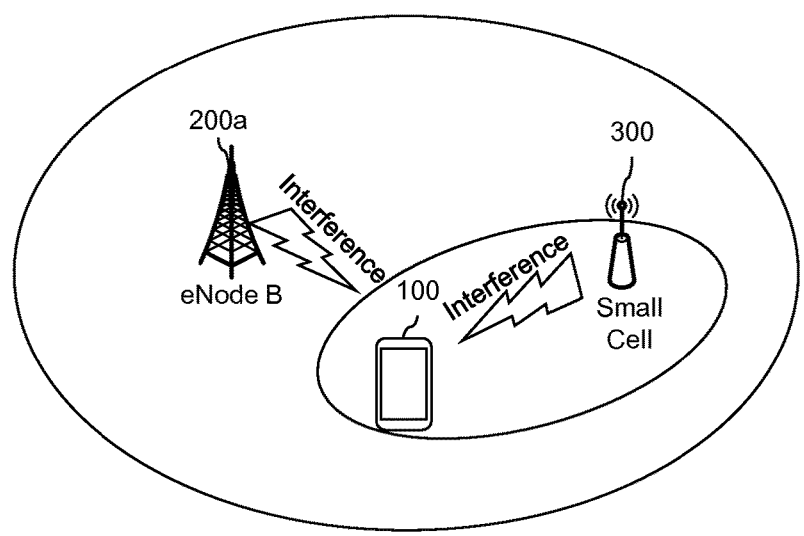
FIG. 12 illustrates a heterogeneous network including a macro cell and a small-scale cell.

FIG. 12 illustrates a heterogeneous network including a macro cell and a small-scale cell.

A heterogeneous network in which a small-scale cell (e.g., a pico cell, a femto cell, or a micro cell) having lower-power transmit power exists in the existing marco cell coverage in an overlapping manner is under discussion in a next-generation communication standard including 3GPP LTE-A.

Referring to FIG. 12, the macro cell may overlap with one or more micro cells. A service of the macro cell is provided by a macro eNodeB (MeNB). In the present application, the macro cell and the MeNB may be used together. A UE having access to the macro cell may be referred to as a macro UE. The marco UE receives a donwlink signal from the MeNB, and transmits an uplink signal to the MeNB.

The aforementioned small-scale cell is also referred to as a femto cell, a pico cell, or a macro cell. A service of the small-scale cell is provided by a pico eNodeB, a home eNodeB (HeNB), a relay node (RN), etc. For convenience, the pico eNodeB, the HeNB, and the RN are collectively referred to as the HeNB. In the present application, the macro cell and the HeNB may be used together.

The heterogeneous network has an inter-cell interfernece problem since the macro cell and the small-scale cell overlap. As illustrated, if the UE is located in a boundary of the macro cell and the small-scale cell, a downlink signal from the macro cell may act as an interfernece. Similarly, a downlink signal of the small-scale cell may also act as an interfernece.

For a more specific example, when the UE 100 connected to the small-scale cell 300 is located in a boundary of the small-scale cell, the connection with the small-scale cell 300 may be disconnected due to an interference from the macro cell 200. This implies that a coverage of the small-scale cell 300 is smaller than expected.

For another example, if the UE 100 connected to the macro cell 200 is located in an area of the small-scale cell 300, the connection with the macro cell 200 may be disconnected due to an interference from the small-scale cell 300. This implies that a shadow area exists in the macro cell 200.

In the most fundamental method for solving such an interference problem, different frequencies are used between cells. However, since a frequency is a rare and expensive resource, a method of solving the problem by using a frequency division is not much welcomed by a vendor.

Therefore, 3GPP intends to solve such an inter-cell interference problem through a time division.

Accordingly, an eICIC (enhanced inter-cell interference coordination) is actively under research recently as one of interference coordination methods in 3GPP.

The time division method introduced in LTE release-10 is called an enhanced ICIC (inter-cell interference coordination) in a sense that it is more enhanced than the conventional frequency division method. In this method, an interfering cell is called an aggressor cell or a primary cell, and an interfered cell is defined as a victim cell or a secondary cell. The aggressor cell or the primary cell stops a data transmission in a specific subframe, and a UE is allowed to maintain a connection with the victim cell or the secondary cell in the corresponding subframe. That is, in this method, if heterogeneous cells co-exist, one cell temporarily stops signal transmission as to a UE which experiences a significantly high interference in a certain area, so that an interference signal is almost not sent.

Meanwhile, a specific subframe in which the data transmission stops is called an ABS (almost blank subframe). No data is transmitted other than essential control information in a subframe corresponding to the ABS. For example, the essential control information is a CRS (cell-specific reference signal). In the current 3GPP LTE/LTE-A standard, the CRS signal exists only in OFDM symbols #0, #4, #7, and #11 in each subframe on a time axis. Accordingly, in the subframe to which the ABS is applied, only the CRS signal is transmitted on the OFDM symbols #0, #4, #7, and #11.

Figure 13A:
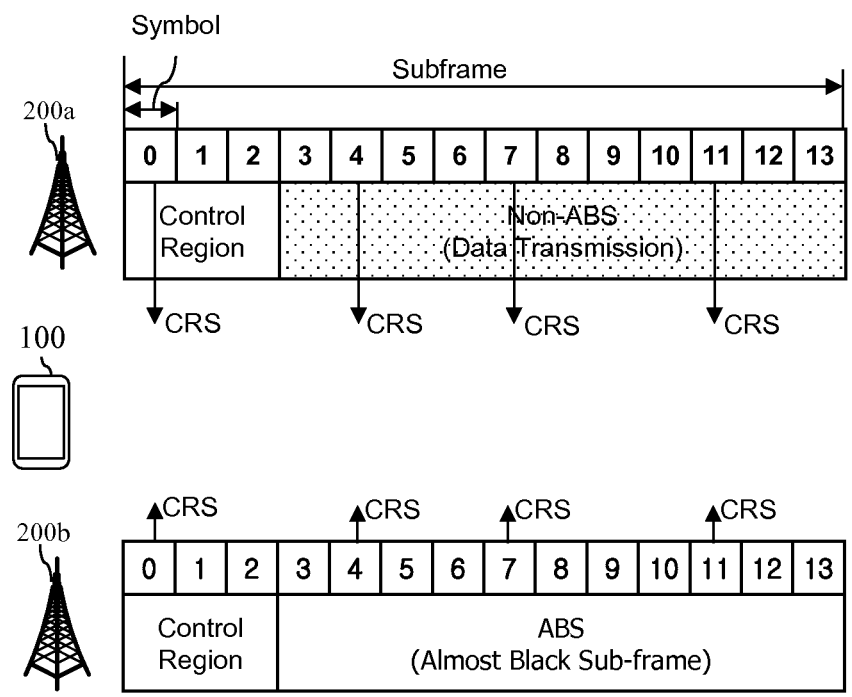
FIG. 13a illustrates enhanced inter-cell interference coordination (eICIC) for solving inter-base station interference.

FIG. 13a illustrates enhanced inter-cell interference coordination (eICIC) for solving inter-base station interference.

Referring to FIG. 13a, the first eNodeB 200a performs data transmission in the data region of a subframe which is depicted, and the CRS signal is transmitted on the symbols #0, #4, #7 and #11.

At the moment, the second eNodeB 200b operates the shown subframe as the ABS.

That is, when the eICIC is applied to the second eNodeB 200b, the corresponding subframe is operated according to the ABS, and no data may be transmitted in the data region. However, in the subframe which is operated according to the ABS, only the CRS is transmitted on the OFDM symbols #0, #4, #7, and #11.

Figure 13B:
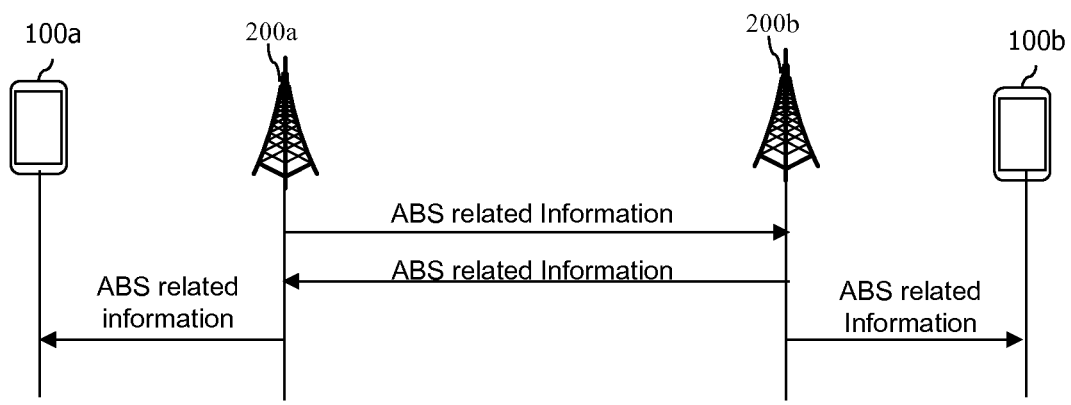
FIG. 13b illustrates an example of exchanging the ABS subframe related information.

FIG. 13b illustrates an example of exchanging the ABS subframe related information.

As we can know by referring to FIG. 13b, through the X2 interface, the ABS related information may be exchanged between the first eNodeB 200a and the second eNodeB 200b, respectively.

In addition, the first eNodeB 200a and the second eNodeB 200b may deliver the ABS related information to their serving UEs 100a/100b, respectively.

The first eNodeB 200a and the second eNodeB 200b may configure the measurement subset for the serving UE 100a/

100b its own and deliver it based on at least one of their ABS related information and the ABS related information of the counterpart.

On the downlink subframe configured as the ABS, since the corresponding cells 200a/200b do not transmit the downlink signal at all or transmit the downlink signal with decreased power, the size of interference influences within the coverage of different cell may become smaller. As such, since the size of interference may be different on whether the corresponding subframe is configured as the ABS, the UE 100 performs the measurement only on a specific subframe which is predefined.

For this, each of the cells 200a/200b may instruct the serving UEs 100a/100b of its own to perform the measurement only on the specific subframe based on at least one of their ABS related information and the ABS related information of the counterpart. This is called a restricted measurement. The instruction may be delivered through higher layer signaling. The higher layer signaling may be a RRC signal. The signal may be a CQI-ReportConfig element.

The ABS related information may include ABS information and an ABS status.

First, the ABS information may include one or more of information elements shown in the following table for example. The ABS pattern information is information which represents a subframe to be used as an ABS in a bitmap format. It may be configured with a bitmap of 40 bits in case of FDD and up to 70 bits in case of TDD. For example, in FDD, the 40 bits indicate 40 subframes, and if a bit value is 1, it indicates an ABS, and if the bit value is 0, it indicates a non-ABS subframe. A measurement subset is a subset of ABS pattern information, and is configured with a bitmap of 40 bits in the FDD case and up to 70 bits in the TDD case. Such a measurement subset is to configure a restricted measurement to a corresponding UE.

TABLE 2

| IE | Description |
| --- | --- |
| ABS Pattern Info | At each position of the bitmap, a value "1" indicates 'ABS', and a value "0" indicates 'non-ABS'. A first position of the ABS pattern corresponds to subframe 0 in a radio frame where SFN = 0. The ABS pattern is continuously repeated in all radio frames. The maximum number of subframes is 40. |
| Measurement Subset | It indicates a subset of the ABS Pattern Info, and is used to configure specific measurements for the UE. |
| ABS Inactive | It indicates that interference coordination by means of ABS is not active. |

Next, the ABS status is used to allow a corresponding cell to determine whether to change an ABS pattern. Usable ABS pattern information is a subset of ABS pattern information, and also consists of a bitmap. The Usable ABS pattern information indicates whether a subframe designated as an ABS is properly used for a purpose of an interference mitigation. The downlink ABS status is a ratio of the number of downlink resource blocks (RBs) scheduled in a subframe indicated in the usable ABS pattern information and RBs allocated for a UE which must be protected using the ABS, and indicates how effectively the ABS is utilized in a victim cell according to an original purpose.

TABLE 3

| IE | Description |
| --- | --- |
| DL ABS status | Percentage of used ABS resources. The numerator of the percentage consists of resource blocks within the ABS indicated in the Usable ABS Pattern Info, and the denominator of the percentage is the total number of resource blocks within the ABS indicated in the Usable ABS Pattern Info. |
| Usable ABS Pattern Info | Each position in the bitmap represents a subframe. A value "1" indicates 'ABS' designated as being protected from inter-cell interference, and a value "0" is used for all other subframes. The pattern represented by the bitmap is a subset of, or the same as, the corresponding ABS Pattern Info. |

A measurement subset consisting of a subset of the ABS pattern information is a subframe used as an ABS. Other subframes may autonomously determine whether a corresponding cell is utilized as an ABS according to a traffic load.

As described so far, in addition to the solution of the inter-cell interference problem through the eICIC technique, the method of adding an interference cancellation function to the UE 100 has been discussed in Rel-11 standard by expending the eICIC.

In case of using the interference cancellation function, since the inter-cell interference is decreased, the coverage of small-scale cell may be expanded. In particular, this will be described by reference to FIG. 14.

Figure 14:
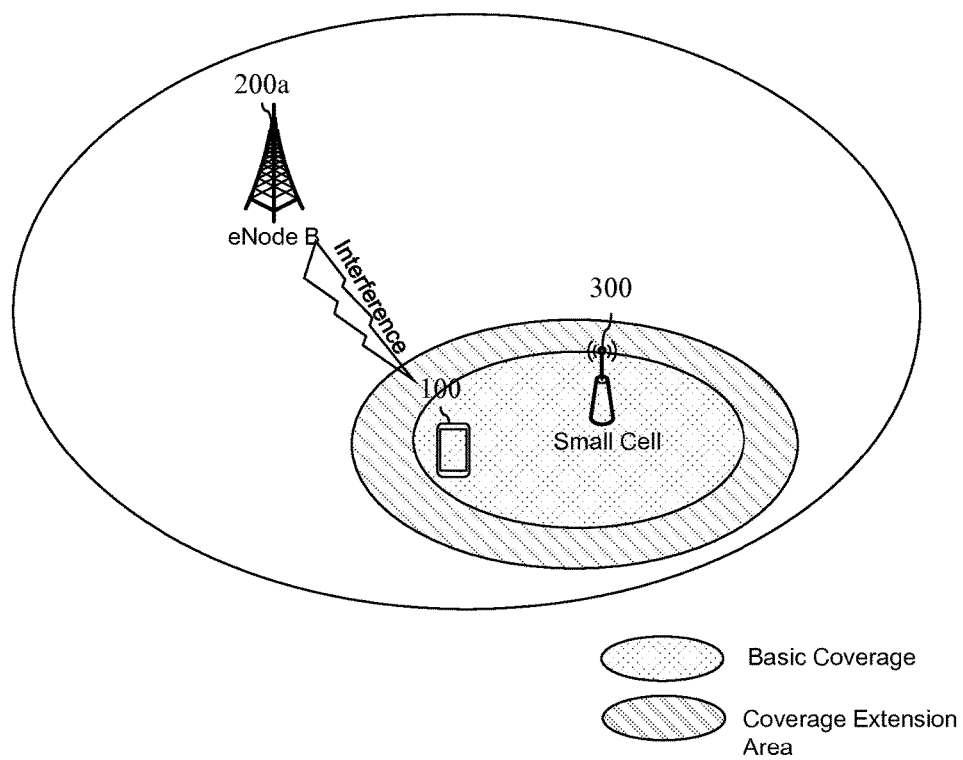
FIG. 14 illustrates a coverage expansion concept for small-scale cells according to a disclosure of the present specification.

FIG. 14 illustrates a coverage expansion concept for small-scale cells according to a disclosure of the present specification.

As shown in FIG. 14, in the coverage of a base station (e.g., eNodeB) 200a of a macro cell, several base station (e.g., pico eNodeB) 300 of a small-scale cell may be installed. And if the UE 100 which has been received services from the base station 200a of the macro cell is existed in the coverage of the base station 300 of the small-scale cell, it is available to handover to the base station 300 of the small-scale cell, and thereby obtaining an effect of offloading the traffic of the base station 200a of the macro cell.

Here, the handover from the base station 200a of the macro cell that corresponds to a serving base station to the base station 300 of the small-scale cell that corresponds to a target base station is performed when a reference signal strength of the target base station is a specific threshold vale or more based on the reference signal strength RSRP and RSRQ that the UE 100 receives from the serving base station.

However, by mobilizing an additional arbitrary means, or by improving the capacity of UE 100, it may be implemented that the handover to the target base station is performed even though the received reference signal strength of the target base station is not greater than the threshold value of the received reference signal strength of the serving base station. As a result, such an operation brings an effect of expending the cell coverage or cell radius of the base station (e.g., pico eNodeB) 300 of the small-scale cell that corresponds to the target base station. In the drawing, the coverage expansion area which is wider than a basic coverage of the small-scale cell 300 is depicted by hatching. Such a coverage expansion area may also be called a Cell Range Expansion (CRE).

Here, when the threshold value used for a general handover is expressed as $S_{th\_conv}$, an area where the CRE is available may be expressed as an area where $S_{th\_conv} <= S_{received} <= S_{th\_CRE}$.

Meanwhile, the reception strength for the reference signal from the small-scale cell 300 may be represented as RSRP/RSRQ measured in the UE 100.

As such, by expanding a basic coverage of the small-scale cell 300 using the interference cancellation function of the UE 100, an effect of offloading the traffic of the base station 200a of the macro cell to the small-scale cell 300 is obtainable.

In other words, using the interference cancellation function of the UE 100, even though the reference signal strength received from the small-scale cell is not greater than the reference signal strength received from the macro cell, it may be implemented to perform handover to the small-scale cell.

Hereinafter, the method of adding the interference cancellation function will be described.

Figure 15A:
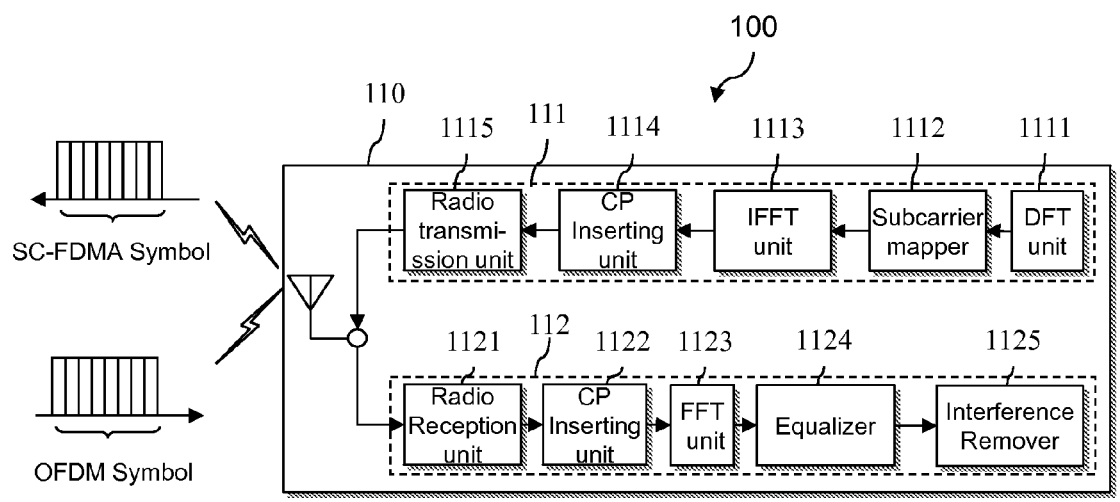
FIG. 15a is a block diagram illustrating the structure of UE according to one embodiment of the present specification.

FIG. 15a is a block diagram illustrating the structure of UE according to one embodiment of the present specification.

In LTE or LTE-A, OFDM is used for a downlink and SC-FDMA similar to OFDM is used for an uplink.

SC-FDMA may also be referred to as discrete Fourier transform (DFT)-spread OFDM (DFT-s OFDM). When SC- is used, non-linear distortion of a power amplifier may be avoided, thus improving transmission power efficiency in a power consumption-limited terminal. Accordingly, user throughput may be enhanced.

SC-FDMA is substantially similar to OFDM in that SC-FDMA transmits signals via separate subcarriers using a Fast Fourier transform (FFT) and inverse FFT (IFFT). A conventional OFDM transmitter has a problem that signals in respective subcarriers on the frequency axis are converted into signals on the time axis by IFFT. That is, IFFT is a scheme of performing the same operation in parallel, and thus peak-to-average power ratio (PAPR) increases. To prevent increase in PAPR, SC-FDMA performs IFFT after DFT spreading, unlike OFDM. That is, a transmission mode in which IFFT is performed after DFT spreading is defined as SC-FDMA. Further, SC-FDMA is also referred to as DFT spread OFDM (DFT-s-OFDM).

SC-FDMA secures robustness to a multipath channel due to a similar structure to OFDM and basically resolves a disadvantage of conventional OFDM that is increase in PAPR by IFFT, thereby allowing efficient use of a power amplifier.

Referring to FIG. 14a, the UE 100 includes a radio frequency (RF) unit 110. The RF unit 110 includes a transmitter 111 and a receiver 112. The transmitter 111 includes a discrete Fourier transform (DFT) unit 1111, a subcarrier mapper 1112, an IFFT unit 1113, a cyclic prefix (CP) insertion unit 1114, and a wireless transmission unit 1115. The transmitter 111 of the RF unit 110 may further include, for example, a scramble unit, a modulation mapper, a layer mapper, and a layer permutator, which may be disposed before the DFT unit 1111. That is, as described above, to prevent increase in PAPR, the transmitter of the RF unit 110 subjects data to the DFT unit 1111 before mapping a signal to a subcarrier. The signal spread (or precoded) by the DFT unit 1111 is mapped onto a subcarrier by the subcarrier mapper 1112 and subjected to the IFFT unit 1113 into a signal on the time axis.

That is, in SC-FDMA, unlike OFDM, PAPR of a signal in the time domain obtained via the IFFT unit 1113 is not substantially increased by correlations between the DFT unit 1111, the subcarrier mapper 1112, and the IFFT unit 1113, thereby providing favorable transmission power efficiency. That is, in SC-FDMA, PAPR or cubic meter (CM) may be decreased.

The DFT unit 1111 performs DFT on input symbols to output complex-valued symbols. For example, when Ntx symbols are input (here, Ntx is a natural number), DFT has a size of Ntx. The DFT unit 1111 may be referred to as a transform precoder. The subcarrier mapper 1112 maps the complex-valued symbols onto respective subcarriers in the frequency domain. The complex-valued symbols may be mapped onto resource elements corresponding to resource blocks allocated for data transmission. The subcarrier mapper 1112 may be referred to as a resource element mapper. The IFFT unit 1113 performs IFFT on the input symbols to output a baseband signal for data as a signal in the time domain. The CP insertion unit 1114 copies latter part of the baseband signal for data and inserts the latter part in front of the baseband signal for data. CP insertion prevents inter-symbol interference (ISI) and inter-carrier interference (ICI), thereby maintaining orthogonality even in a multipath channel.

Meanwhile, the 3GPP is actively carrying out standardization of LTE-Advanced, evolving from LTE, for which clustered DFT-s-OFDM allowing non-contiguous resource allocation is adopted.

Clustered DFT-s-OFDM is a modification of existing SC-FDMA, which divides data symbols having been subjected to a precoder into a plurality of sub-blocks and separately mapping the sub-blocks in the frequency domain. An important feature of clustered DFT-s-OFDM allows frequency selective resource allocation to deal with a frequency selective fading environment in a flexible manner.

Here, clustered DFT-s-OFDM adopted as an uplink access mode for LTE-Advanced allows non-contiguous resource allocation, unlike SC-FDMA as an uplink access for LTE, and thus transmitted uplink data may be divided into a plurality of cluster units.

That is, the LTE system is configured to maintain a single carrier characteristic in an uplink, whereas the LTE-A system allows non-contiguous allocation of DFT-precoded data to the frequency axis or simultaneous transmissions of a PUSCH and PUCCH.

Meanwhile, the receiver 112 of the RF unit 110 includes a wireless reception unit 1121, a CP cancellation unit 1122, an FFT unit 1123, an equalizer unit 1124, and an interference cancellation unit 1125. The wireless reception unit 1121, the CP cancellation unit 1122, and the FFT unit 1123 of the receiver perform reverse functions of the wireless transmission unit 1115, the CP insertion unit 1114, and the IFFT unit 1113 of the transmitter 111.

The interference cancellation unit 1125 cancels or relieves interference included in a received signal.

The interference cancellation unit 1125 is added for dealing with an explosively increasing demand for radio data and for canceling interference.

Figure 15B:
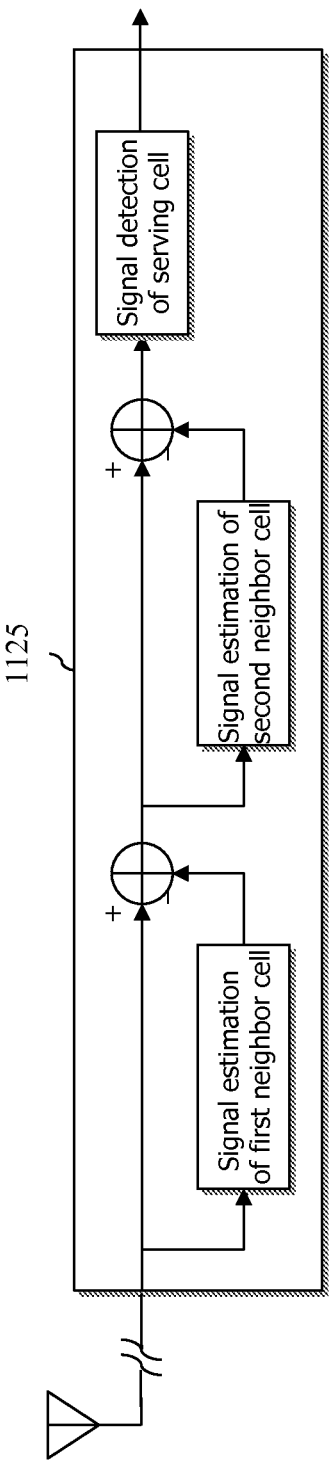

FIG. 15b is a block diagram illustrating operations of the interference cancellation unit shown in FIG. 15a.

The receiver 112 additionally including the interference cancellation unit 1125, which is called an interference cancellation (IC) receiver or interference rejection combiner (IRC) receiver, is configured to subtract an interference signal from a received signal.

Here, complexity of the receiver additionally including the interference cancellation unit 1125 depends on a maximum number of cells as an interference cancellation target and kinds of signals to be cancelled. FIG. 15b illustrates operations of performing interference cancellation of up to two interference sources.

The receiver, in which the interference cancellation unit 1125 is added, co-called the IC receiver or the IRC receiver may cope with wireless data requirements which are explosively increased. Particularly, since the increase in reception performance is obtainable without significant increase of complexity, significant performance gain is obtainable in the environment in which interference from neighboring base station is dominant.

By using the interference cancellation function described so far, area expansion up to 6 dB, that is, the Cell Range Expansion (CRE) is available.

The signal which is a target of interference cancellation may be basic Cell specific Reference Signal (CRS), Physical Broadcasting Channel (PBCH), Primary Synchronization Signal (PSS), Secondary Synchronization Signal (SSS), and so on. In addition, the signal which is a target of interference cancellation may be Physical Downlink Shared Channel (PDSCH) for user data transmission.

However, the interference cancellation (IC) for the CRS, the interference cancellation (IC) for the PSCH and the interference cancellation (IC) for the SSCH may be implemented with relatively low complexity since the UE may know the sequence for the CRS, PSCH and SSCH beforehand.

On the other hand, in case of the channel where arbitrary information such as the PBCH and the PDSCH is transmitted, the problem occurs that the UE that is going to perform the interference cancellation should receive the information transmitted to the corresponding channel beforehand.

In case of the PBCH among these, there is little change in transmitted information but the System Frame Number (SFN). Considering low encoding rate, retransmission over four times with 40 ms cycle and an operation of relatively simple Channel Coding, the PBCH is available to be implemented with relatively proper complexity.

Meanwhile, the PDSCH uses various Modulation Coding Scheme (MCS) in addition to the application of turbo code, and may schedule arbitrary Resource Blocks (RBs) different from each other when scheduling resources between neighboring base stations. Accordingly, since there is a possibility that a plurality of PDSCH signals flow in from interference cells are located at a location of RB allocated to a UE from a serving cell, the decoding for the PDSCH that may be existed for the entire RBs is required in order to perform the interference cancellation (IC) by the UE. Hereinafter, how complex the interference removal for the PDSCH will be described by reference to FIG. 16.

Figure 16:
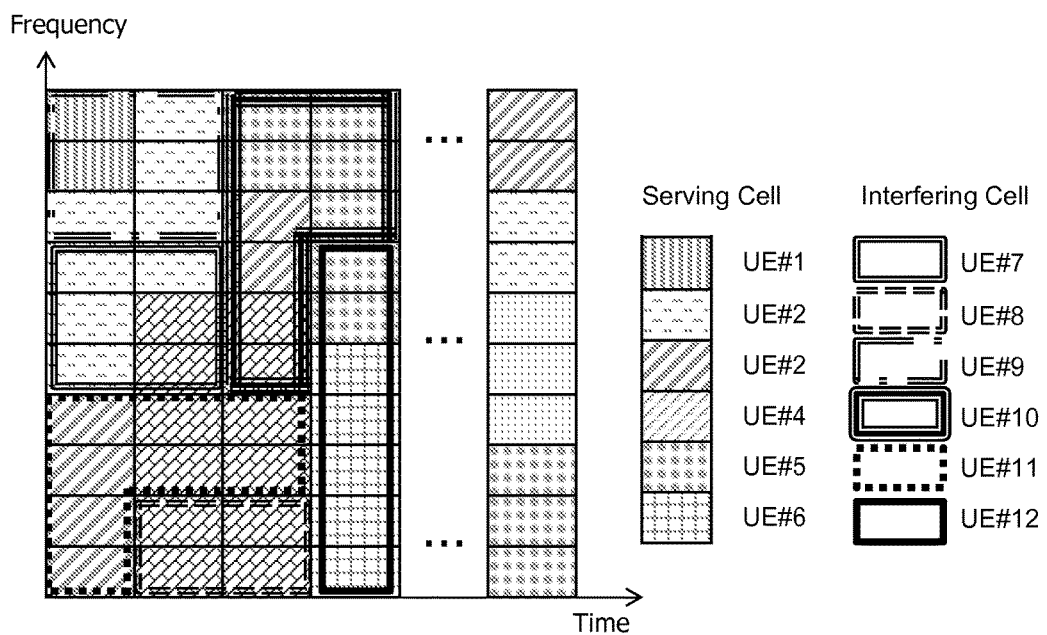
FIG. 16 is a resource block diagram illustrating how complex the interference removal for the PDSCH.

FIG. 16 is a resource block diagram illustrating how complex the interference removal for the PDSCH.

Referring to FIG. 16, the RBs allocated to UE #1 to UE #6 by a serving cell are shown with different patterns each other, and the RBs allocated to UE #7 to UE #12 by an interference cell are shown with boxes.

For example, when UE #4 shown in the drawing performs interference cancellation for the PDSCH received from a neighboring cell, it is required to perform decoding for the PDSCH channel for UE #7, UE #8, UE #10 and UE #12 that have a RB which is overlapped with the RBs that the UE #4 is allocated from the serving cell. At the moment, since UE #4 is unable to know the information on the RB allocation in the interference cell, consequently, UE #4 should perform a blind decoding for entire RBs, and therefore, calculation amount may be seriously increased.

Figure 17A:
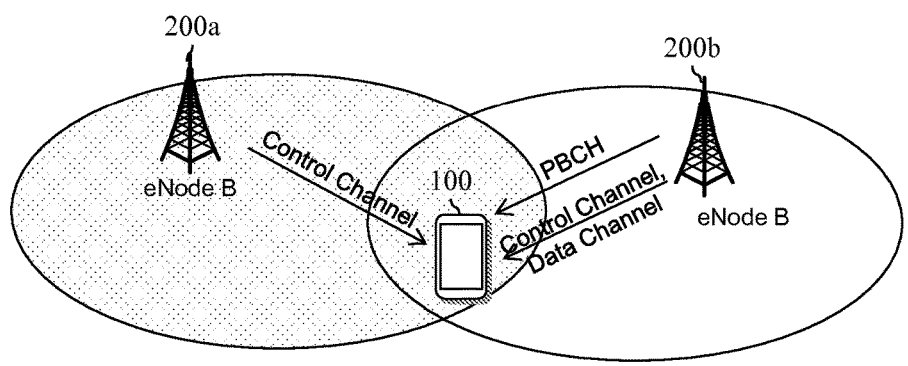
FIG. 17a and FIG. 17b illustrate situations that a serving cell undergoes interference by a neighbor cell of a control channel.
Figure 17B:
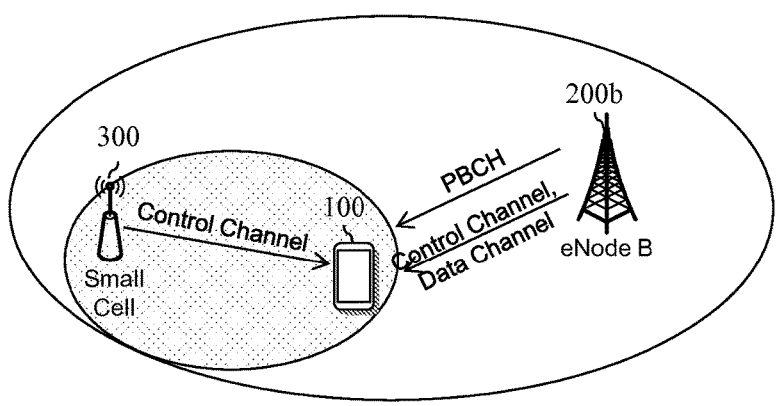

FIG. 17a and FIG. 17b illustrate situations that a serving cell undergoes interference by a neighbor cell of a control channel.

Referring to FIG. 17a, the situation is shown that a serving cell of UE 100 is a first eNodeB 200a and a neighbor cell that causes interference is a second eNodeB 200b. The control channel (e.g., PDCCH, PCFICH or PHICH) that the first eNodeB 200a, which is the serving cell, transmits undergoes interference by at least one of the PBCH from the second eNodeB 200b, which is the neighbor cell, a control channel (e.g., PDCCH, e-PDCCH, PCFICH or PHICH) and a data channel (e.g., PDSCH).

Meanwhile, referring to FIG. 17b, the situation is shown that a serving cell of UE 100 is a small-scale cell 300 and a neighbor cell that causes interference is the second eNodeB 200b, when the small-scale cell 300 is existed with being overlapped within the coverage of the second eNodeB 200b that corresponds to the macro cell. Similarly, in this time, the control channel (e.g., PDCCH, PCFICH or PHICH) that the small-scale cell 300, which is the serving cell, transmits undergoes interference by at least one of the PBCH from the second eNodeB 200b, which is the neighbor cell, a control channel (e.g., PDCCH, e-PDCCH, PCFICH or PHICH) and a data channel (e.g., PDSCH).

At the moment, which the control channel (e.g., PDCCH, PCFICH or PHICH) that the serving cell transmits undergoes interference from the PBCH from the neighbor interfering cell, a control channel (e.g., PDCCH, e-PDCCH, PCFICH or PHICH) and a data channel (e.g., PDSCH) may be different depending on whether downlink synchronization is tuned between the serving cell and the neighbor interfering cell, otherwise, if the synchronization is not tune, what amount of the timing offset. Hereinafter, this will be described by reference to FIG. 18a to FIG. 18d.

FIG. 18a to FIG. 18d illustrate examples that the control channel of a serving cell undergoes interference by a neighbor cell, respectively.

Figure 18A:
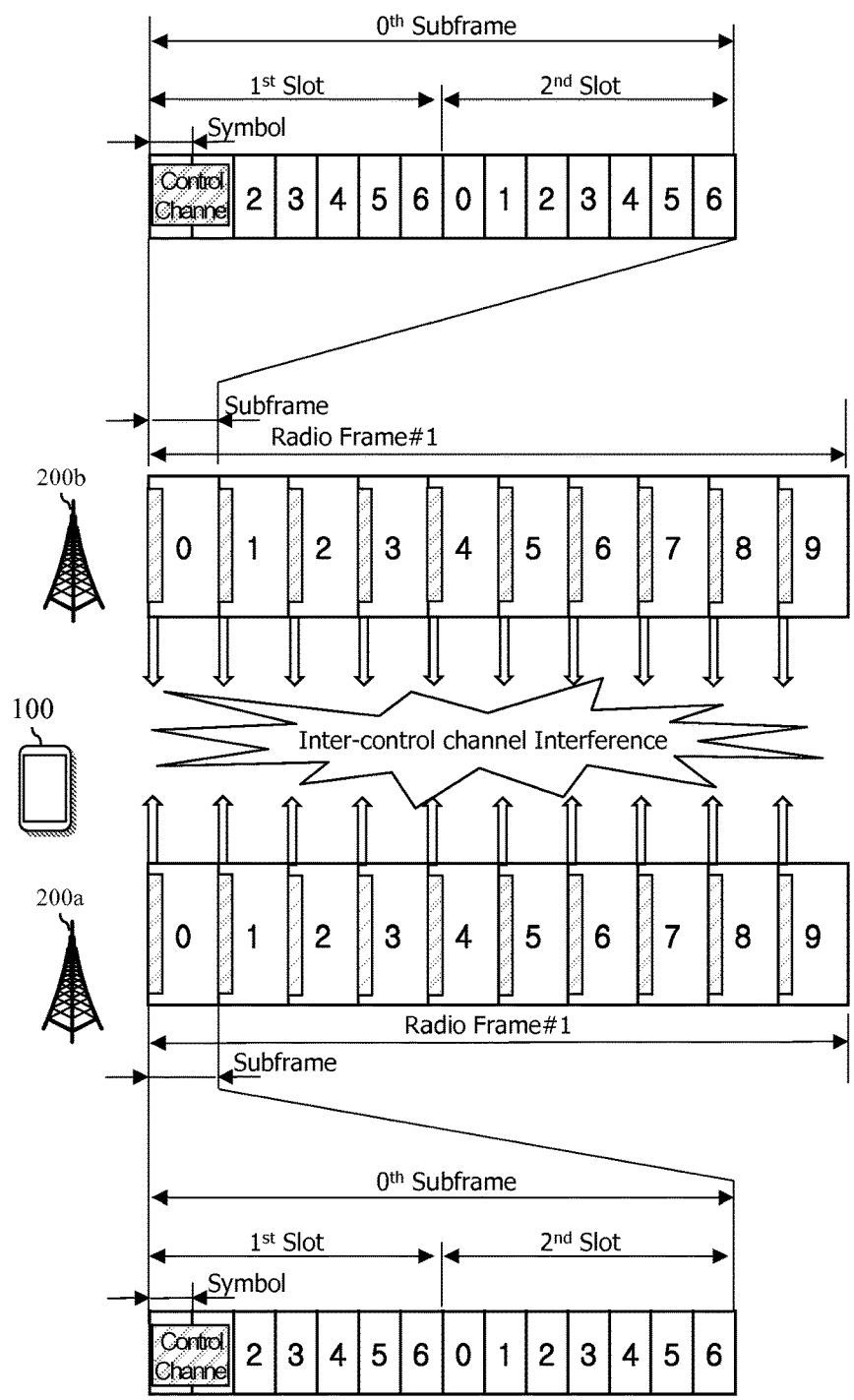
FIG. 18a to FIG. 18d illustrate examples that the control channel of a serving cell undergoes interference by a neighbor cell, respectively.

First, as we can know from FIG. 18a, in case that downlink is synchronized (i.e., timing offset is zero) between a first eNodeB 200a that corresponds to a serving cell of UE and a second eNodeB 200b (or a small-scale cell) that corresponds to a neighbor interfering cell, and in case that the control channel of the serving cell 200a is transmitted on two symbols, the control channel (e.g., PDCCH, PCFICH or PHICH) influences interference on the control channel (e.g., PDCCH, PCFICH or PHICH) of the serving cell 200a.

Figure 18B:
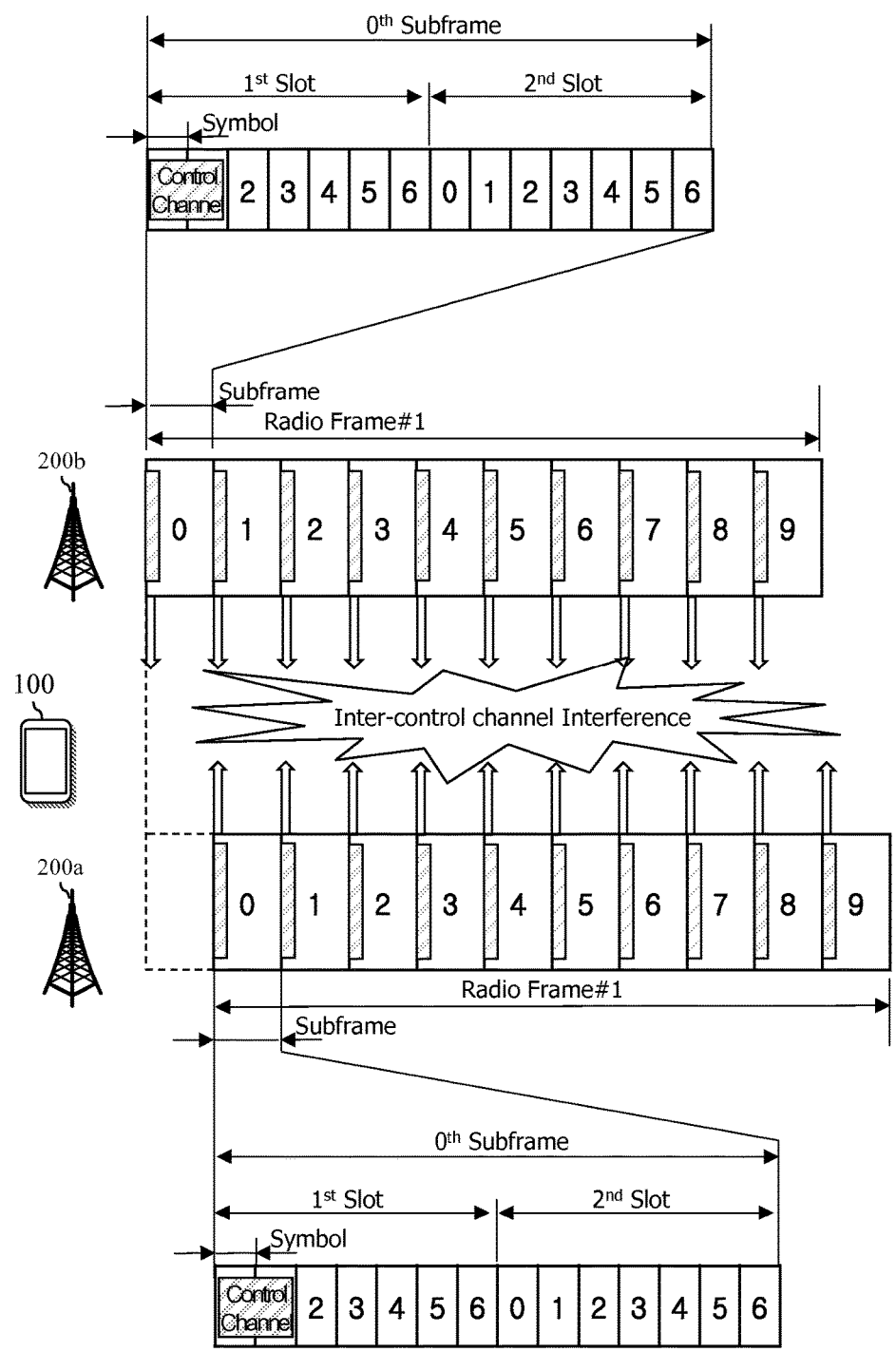

Similarly, as we can know from FIG. 18b, in case that downlink is not synchronized between the serving cell 200a of UE 100 and the neighbor interfering cell 200b, in case that the timing offset is a unit of subframe, and in case that the control channel from the interference cell 200b is transmitted on two symbols, the control channel (e.g., PDCCH, PCFICH or PHICH) influences interference on the control channel (e.g., PDCCH, PCFICH or PHICH) of the serving cell 200a.

Figure 18C:
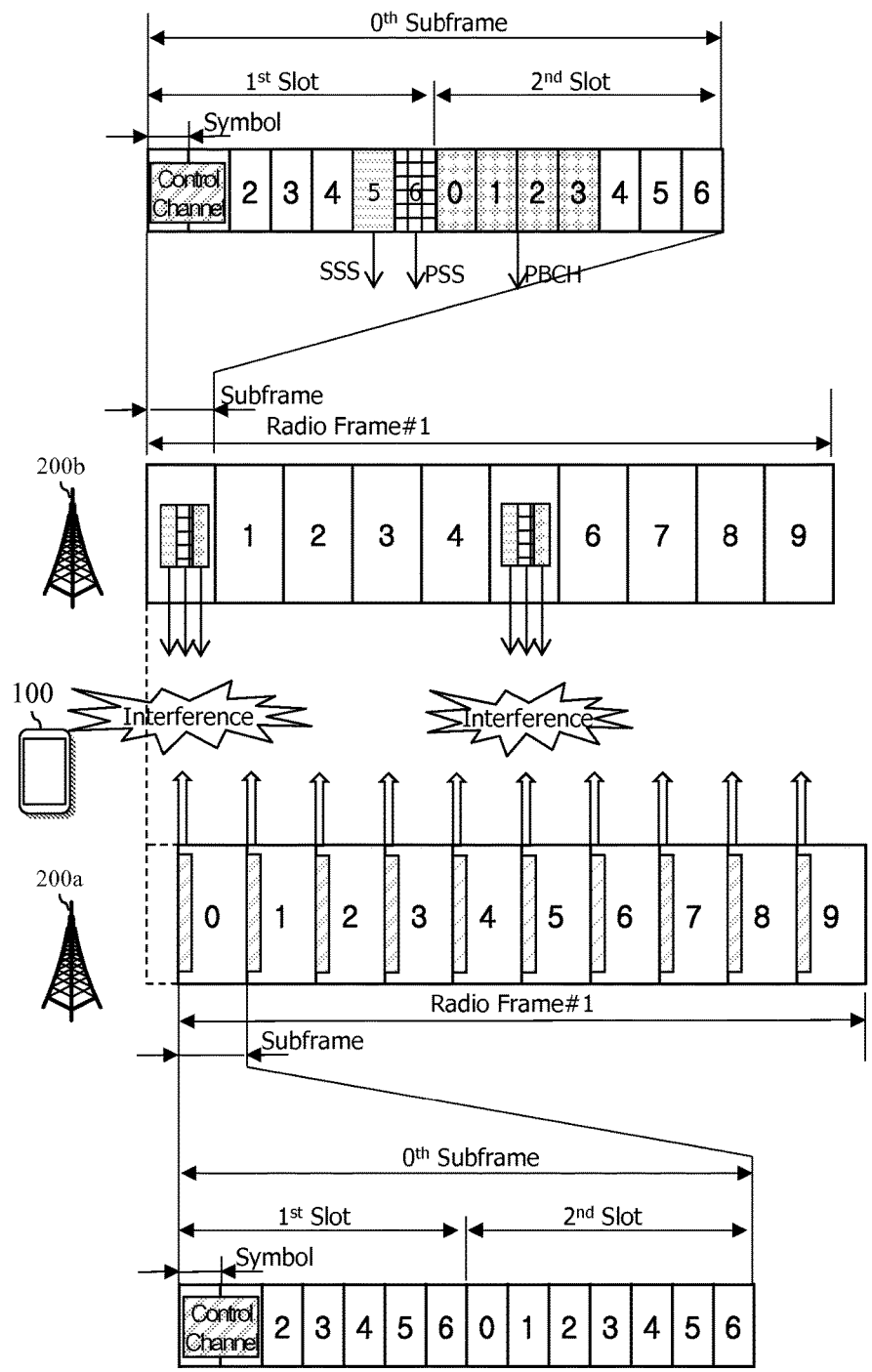

However, as we can know from FIG. 18c, in case that downlink is not synchronized between the serving cell 200a of UE 100 and the neighbor interfering cell 200b, in case that the timing offset corresponds to five to ten symbols, and in case that the control channel from the interference cell 200b is transmitted on two symbols, at least one of PSS, SSS and PBCH from the interference cell 200b influences on the control channel (e.g., PDCCH, PCFICH or PHICH) of the serving cell 200a.

Particularly, in case that the timing offset corresponds to five to six symbols, and in case that the control channel of the serving cell 200*a* is transmitted on two symbols, the control channel (e.g., PDCCH, PCFICH or PHICH) of the serving cell 200*a* undergoes influence by the PSS and the SSS located on the $0^{th}$ subframe and the $6^{th}$ subframe of the interference cell 200*b*. In addition, in case that the timing offset corresponds to seven to ten symbols, and in case that the control channel of the serving cell 200*a* is transmitted on two symbols, the control channel (e.g., PDCCH, PCFICH or PHICH) of the serving cell 200*a* undergoes influence by the PBCH of the interference cell 200*b*.

Figure 18D:
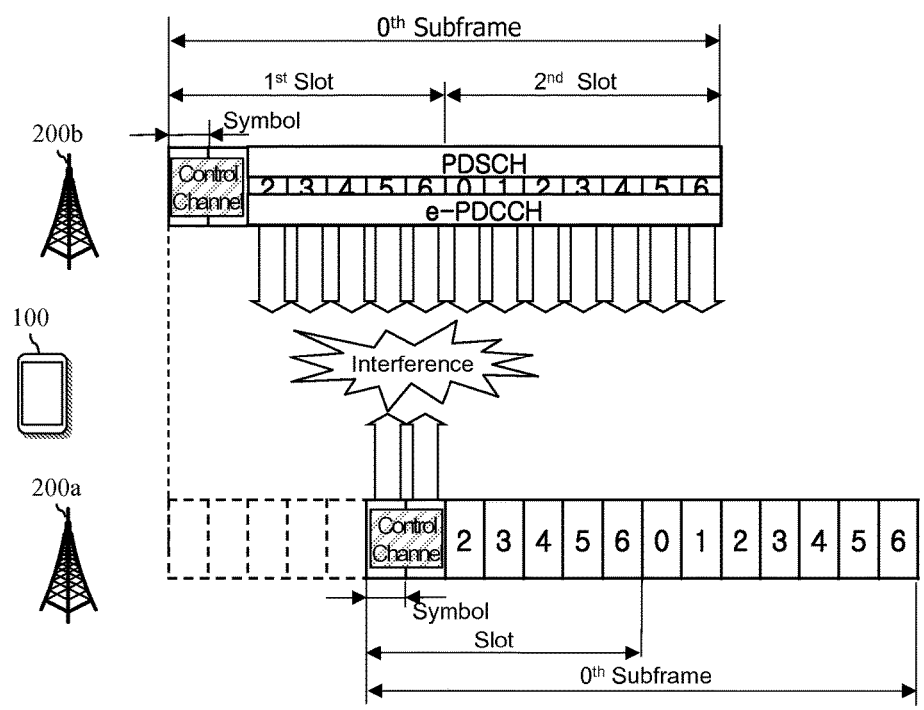

In addition, as we can know from FIG. 18*d*, in case that downlink is not synchronized between the serving cell 200*a* of UE 100 and the neighbor interfering cell 200*b*, in case that the timing offset corresponds to five to ten symbols, and in case that the control channel from the interference cell 200*b* is transmitted on two symbols, at least one of the PDSCH and the e-PDCCH from the interference cell 200*b* influences on the control channel (e.g., PDCCH, PCFICH or PHICH) of the serving cell 200*a*.

Meanwhile, although it is not shown, in addition to the above-described timing offset, at least one of the PDSCH and the e-PDCCH from the interference cell 200*b* may influence on the control channel (e.g., PDCCH, PCFICH or PHICH) of the serving cell 200*a*.

As we can know by reference to FIG. 18*a* to FIG. 18*d* described above, in order to receive the control channel from the serving cell by the UE 100 with high performance, the interference by at least one of PSS, SSS or PBCH from the neighbor interfering cell 200*b*, the control channel (e.g., PDCCH, e-PDCCH, PCFICH or PHICH) and the data channel (e.g., PDSCH).

However, in order for the UE 100 to remove the interference, first, the channel is estimated, after the channel transmitted from the neighbor interfering cell 200*b* is decoded, the decoded channel is encoded again, and then the original channel signal should be regenerated using the estimated channel value, which procedure is very complex. In addition, in order to decode the channel transmitted from the neighbor interfering cell 200*b*, the information on the number of antenna of the neighbor interfering cell 200*b* is required. For this, the blind decoding should be performed, which increases the complexity. In addition, since considerable time is required to decode the channel from the serving cell 200*a*, the decoding time is extended for decoding even the channel transmitted from the neighbor interfering cell 200*b*.

However, if it is available to omit the channel decoding procedure among the series of procedures to remove the interference, the complexity of UE may be considerably decreased.

Accordingly, hereinafter, an embodiment of the present specification to omit decoding for the channel from the neighbor interfering cell will be described. That is, the interference cancellation function is added in FeICIC and a UE should remove interference component on its own, but this increases complexity. As an alternative way, the Network Assisted Interference Cancellation and Suppression (NAICS) is requested.

In one embodiment of the present specification, in order for the UE 100 not to decode the channel from the neighbor interfering cell 200*b*, the serving cell 200*a* may provide the interference cancellation assistance information for the channel of the neighbor interfering cell 200*b* with the UE 100.

In case that the channel of the neighbor interfering cell 200*b* that influences on the control channel of the serving cell 200*a* is the control channel shown in FIG. 18*a* and FIG. 18*b*, the interference cancellation assistance information may include information on the control channel (e.g., PDCCH, PCFICH or PHICH) of the neighbor interfering cell 200*b*. In addition, in case that the channel of the neighbor interfering cell 200*b* that influences on the control channel of the serving cell 200*a* is at least one of PSS, SSS and PBCH as shown in FIG. 18*c*, the interference cancellation assistance information may include information on at least one of the PSS, SSS and PBCH of the neighbor interfering cell 200*b*. In addition, in case that the channel of the neighbor interfering cell 200*b* that influences on the control channel of the serving cell 200*a* is at least one of PDSCH and e-PDCCH shown in FIG. 18*d*, the interference cancellation assistance information may include information on at least one of the PDSCH and e-PDCCH of the neighbor interfering cell 200*b*. Hereinafter, an embodiment of the present specification will be described in more detail by reference to the drawings.

Figure 19:
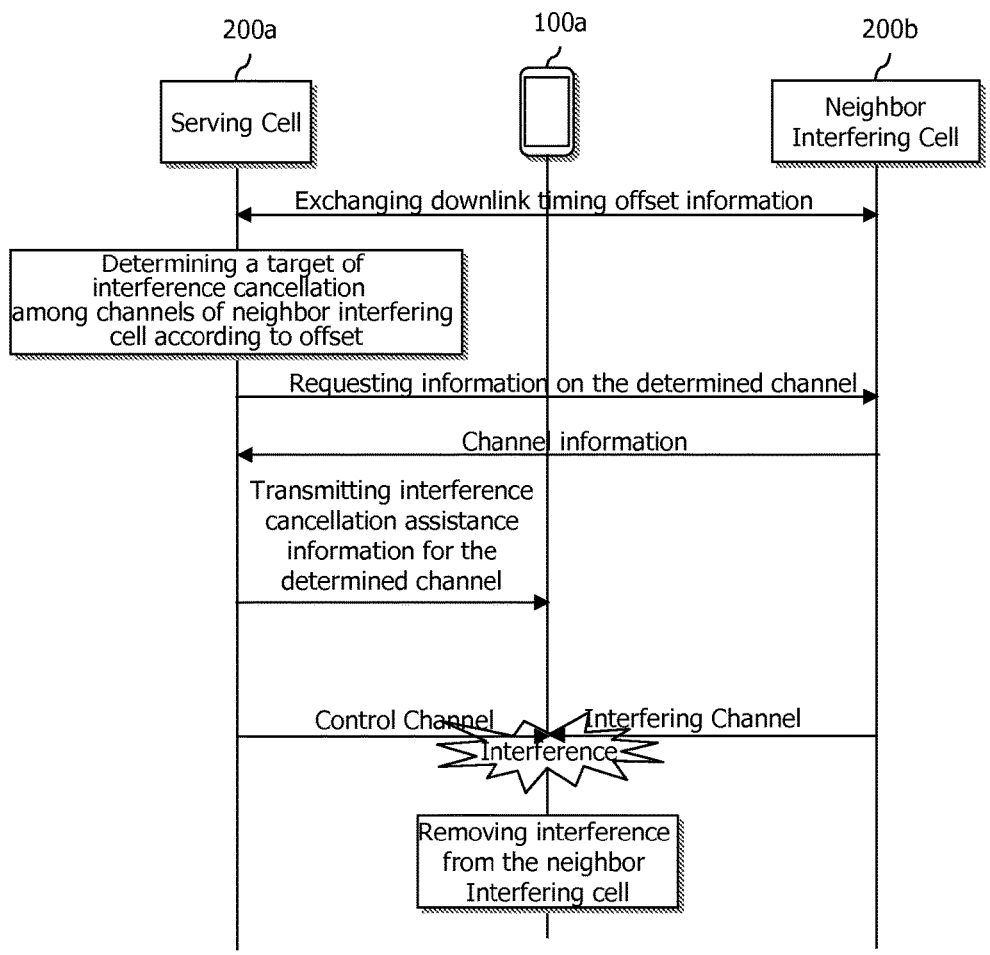
FIG. 19 is a signal flow chart according to an embodiment of the present specification.

FIG. 19 is a signal flow chart according to an embodiment of the present specification.

As we can know by reference to FIG. 19, a serving cell 200*a* exchanges information on downlink synchronization with a neighbor interfering cell 200*b*.

Subsequently, the serving cell 200*a* determines on which channel of the neighbor interfering cell exerts interference on the control channel of the serving cell 200*a*, according to the timing offset. That is, the serving cell 200*a* determines on which channel is a target of interference cancellation by the UE 100 among the channels of the neighbor interfering cell according to the timing offset.

Subsequently, the serving cell 200*a* requests the information on the channel determined as the target of interference cancellation to the neighbor interfering cell 200*b* and receives it.

Subsequently, the serving cell 100*a* transmits the interference cancellation assistance information on the channel of the neighbor interfering cell which is determined as the target of interference cancellation to the UE 100. At the moment, in case that the channel of the neighbor interfering cell which will be the target of the interference cancellation is a control channel, since the interference by the control channel is changed frequently due to its characteristics, the serving cell 200*a* may deliver the interference cancellation assistance information with a unit of each subframe.

Then, when the UE 100 receives the control channel from the serving cell 200*a*, the UE 100 may remove the interference from the neighbor interfering cell 200*b* using the interference cancellation assistance information. Particularly, the UE 100 encodes the channel of the neighbor interfering cell 200*b* which is a target of interference cancellation based on the interference cancellation assistance information, and regenerates the channel of the neighbor interfering cell 200*b* using the encoded channel and the channel estimation result. Subsequently, the UE acquires the control channel of the serving cell 200*a* by removing the interference by the channel of the neighbor interfering cell 200*b* using the channel of the neighbor interfering cell 200*b* which is regenerated. The channel estimation may be performed using the CRS and the DMRS of OFDM symbol.

Meanwhile, hereinafter, the interference cancellation assistance information will be described in more detail.

The interference cancellation assistance information may be divided into information required in common regardless of the sort of channel which is a target of interference cancellation and information dedicated to the channel which is a target of interference cancellation.

First, the information required in common may include the number of transmission antenna of the neighbor interfering cell that causes interference and the E-UTRA Absolute Radio Frequency Channel Number (EARFCN) that represents whether the information is intra-frequency or inter-frequency. Of course, the information may be known through the PBCH blind decoding and the PSS/SSS decoding of the UE 100. However, it becomes complex since the UE 100 should know how the PBCH/PSS/SSS is transmitted actually from the transmission antenna of the neighbor interfering cell to perform decoding. Accordingly, it is more efficient to transmit this by the serving cell 200a to the UE 100.

In addition, the information required in common may include system bandwidth information, scrambling code seed, Transmission mode, System Frame Number (SFN) offset and timing offset (based on serving cell). Although such information may be know through blind decoding of the UE 100, it is efficient that the serving cell 200a transmit it to the UE 100, since the complexity increases. Here, the scrambling code seed may be a cell ID of the neighbor interfering cell. And by timing offset, the UE 100 may know the timing of performing the interference cancellation actually.

Next, the information dedicated to the channel which is a target of interference cancellation will be described as follows.

1) The case that the control channel of the serving cell undergoes interference by the PBCH or the PSS/SSS of the neighbor interfering cell The information required in common (the number of transmission antenna, EARFCN, the system bandwidth information, the scramble code seed, the transmission mode, the SFN offset and the timing offset with the neighbor interfering cell) described above Power ratio between the PBCH/PSS/SSS and the CRS 2) The case that the control channel of the serving cell undergoes interference by the control channel of the neighbor interfering cell, The information required in common (the number of transmission antenna, EARFCN, the system bandwidth information, the scramble code seed, the transmission mode, the SFN offset and the timing offset with the neighbor interfering cell) described above Power ratio between the control channel and the CRS Cross carrier scheduling configuration information (CrossCarrierSchedulingConfig information)

PDCCH format allocated to UE, location of RB where PDCCH is allocated, whether it is cyclic shift, DCI format Location of RB where the PCFICH is allocated Location of RB where the PHICH is located, orthogonal sequence index, PHICH group, PHICH section 3) The case that the control channel of the serving cell undergoes interference by the data channel of the neighbor interfering cell The information required in common (the number of transmission antenna, EARFCN, the system bandwidth information, the scramble code seed, the transmission mode, the SFN offset and the timing offset with the neighbor interfering cell) described above PDSCH configuration information (PDSCH-Config information)

iii) The number of RANK, MCS and PMI of each RANK

4) The case that the control channel of the serving cell undergoes interference by the e-PDCCH of the neighbor interfering cell The information required in common (the number of transmission antenna, EARFCN, the system bandwidth information, the scramble code seed, the transmission mode, the SFN offset and the timing offset with the neighbor interfering cell) described above Power ratio between the e-PDCCH and the CRS RRC signal that represents RB allocation/transmission type for the e-PDCCH The RRC signal may be RadioResourceConfigDedicated message. This may include dmrs-ScrambleingSequenceInt, epdcch-SetConfig, epdcch-SetIdentity, epdcch-StartSymbol, epdcch-SubframePatternConfig, epdcch-TransmissionType, numberPRBPairs, resourceBlockAssignment, epdcch-SetConfigReleaseList and epdcch-SetConfigAddModList.

The cross carrier scheduling configuration information described above may include the fields as represented in the table below.

TABLE 4

| CrossCarrierSchedulingConfig field |
|---|
| cif-Presence |
| This field is used to represent whether carrier indicator field (CIF) exists. |
| pdsch-Start |
| OFDM symbol starting position of the PDSCH for interested Scell |
| schedulingCellId |
| This field represents which cell transmits downlink allocation and uplink grant. |

The PDSCH configuration information described above may include the fields as represented in the table below.

TABLE 5

| PDSCH-Config field |
|---|
| optionalSetOfFields |
| In case that this field is included, UE should release the configuration provided previously, and apply values from serving cell. |
| p-a |
| Value for transmission power of PDSCH |
| p-b |
| A value for transmission power of PDSCH |
| pdsch-Start |
| OFDM symbol starting position of the interested serving cell |
| referenceSignalPower |
| Reference signal power |

The e-PDCCH configuration information described above may include the fields as represented in the table below.

TABLE 6

| EPDCCH-Config field |
|---|
| dmrs-ScramblingSequenceInt |
| Initial parameter of DRMS scrambling sequence |
| epdcch-SetConfig |
| ePDCCH configuration set |
| epdcch-SetIdentity |
| Identifier of e-PDCCH configuration set |
| epdcch-StartSymbol |
| Initial position of e-PDCCH의 OFDM symbol |
| epdcch-SubframePatternConfig |
| This field represents a subframe that should monitor UE-specific search space of e-PDCCH. |
| epdcch-TransmissionType |
| This field represents whether distributed or local e-PDCCH transmission mode is used. |
| numberPRBPairs |

TABLE 6-continued

EPDCCH-Config field

This field represents the number of physical resource block pair used for e-PDCCH set.
resourceBlockAssignment
Index for a specific set of physical resource block pair for e-PDCCH set Meanwhile, since the information required in common regardless of the sort of channel which is a target of interference cancellation and the information dedicated to the channel which is a target of interference cancellation have great size, the information may increase load to the serving cell 200a. Accordingly, a method of effectively deliver the information to the UE may be required. This will be described as follows.

First, in case that the channel which is a target of interference cancellation is the control channel or the PDSCH, since such channels are changed in each subframe, the serving cell 200a should transmit it for each subframe. However, this method increases complexity. Therefore, according to an embodiment of the present specification, in order to make it simple, the serving cell 200a may notify the information on the common search space for the neighbor UE that belongs to the neighbor interfering cell 200b to the UE 100 in a unit of subframe. Then, the UE 100 monitors the common search space of the neighbor UE that belongs to the neighbor interfering cell 200b, and the UE may receive the control information that the neighbor interfering cell 200b transmits the neighbor UE. According to such an improved method, since the serving cell 200a is not required to transmit the information to the UE 100 after acquiring the information, it may be more effective.

Or, in case that the channel which is a target of interference cancellation is the data channel, that is, the PDSCH, the serving cell 200a may setup a specific time interval, and transmit the information dedicated to the channel for interference cancellation for the data channel in the specific time interval to the UE100.

Figure 20:
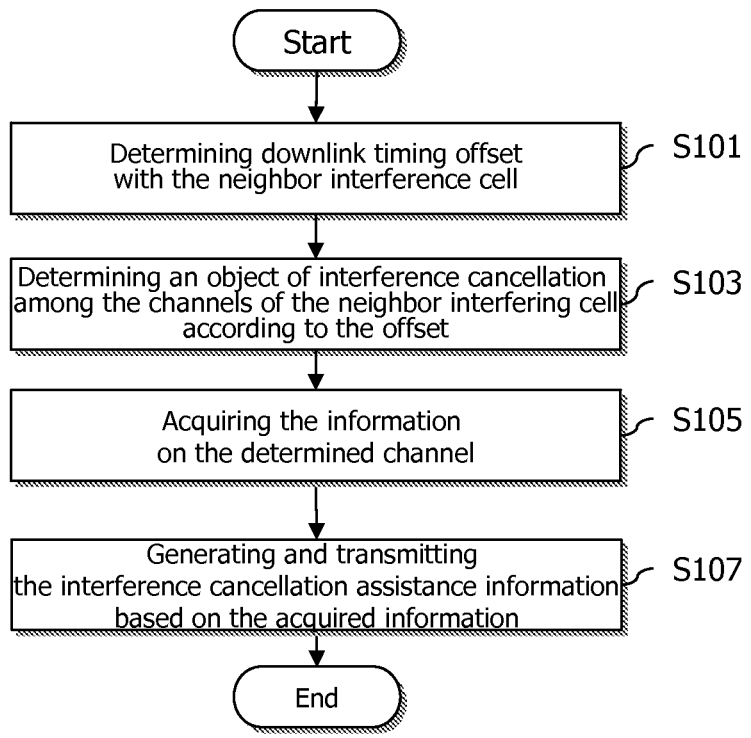
FIG. 20 is a flow chart illustrating a procedure of serving cell according to an embodiment of the present specification.

FIG. 20 is a flow chart illustrating a procedure of serving cell according to an embodiment of the present specification.

As we can know by reference to FIG. 20, first, the serving cell 200a determines downlink timing offset with the neighbor interfering cell 200b (step, S101). For this, the serving cell 200a, as shown in FIG. 19, may exchange the information on downlink timing offset with the neighbor interfering cell 200b.

Next, the serving cell 200a determines a channel which will be a target of interference cancellation among the channels of the neighbor interfering cell according to the timing offset (step, S103).

Then, the serving cell 200a acquires the information on the determined channel (step, S105).

Subsequently, the serving cell 200a generates the interference cancellation assistance information based on the acquired information, and transmits it to the UE 100 (step, S107).

The embodiments illustrated above may be implemented by various instruments. For example, the embodiments of the present invention may be implemented by hardware, firmware, software, or combinations thereof, which will be described in detail with reference to FIG. 21.

Figure 21:
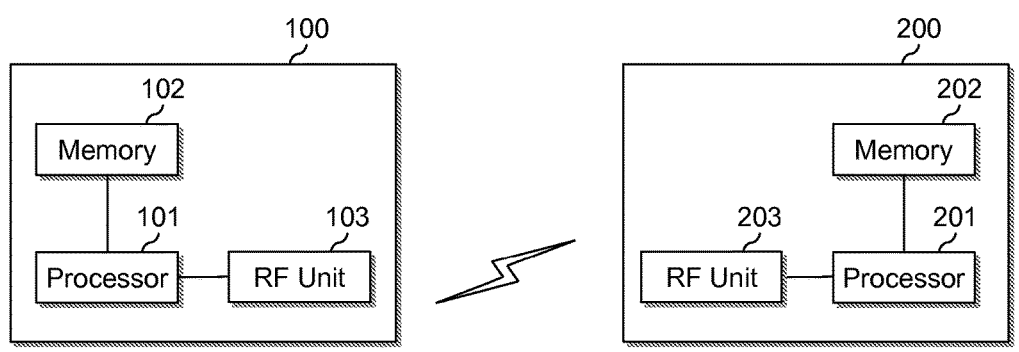
FIG. 21 is a block diagram illustrating a wireless communication system according to an embodiment of the present invention.

FIG. 21 is a block diagram illustrating a wireless communication system according to an embodiment of the present invention.

ABS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operaiton of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for transmitting assistance information for interference cancellation for a user equipment, the method comprising:

determining, by a serving cell, a downlink timing offset with a neighbor interfering cell;

selecting, by the serving cell, a channel which is subjected to an interference cancellation among channels of the neighbor interfering cell based on how much the downlink timing offset is, wherein the channel is selected in consideration of whether the channel interferes with a control channel of the serving cell;

generating, by the serving cell, interference cancellation assistance information for the selected channel; and transmitting, by the serving cell, the interference cancellation assistance information to the user equipment, wherein the interference cancellation assistance information includes information on a number of transmission antennas of the neighbor interfering cell that causes interference and an Evolved Universal Terrestrial Radio Access (E-UTRA) Absolute Radio Frequency Channel Number (EARFCN).

2. The method of claim 1, wherein the control channel includes at least one of a Physical Downlink Control Channel (PDCCH), a Physical Control Format Indicator Channel (PCFICH) and a Physical Hybrid Automatic Repeat Request (HARQ) Indicator Channel (PHICH).

3. The method of claim 1, wherein the determining the downlink timing offset includes:
exchanging, by the serving cell, information on the downlink timing offset with the neighbor interfering cell.

4. The method of claim 1, wherein the generating the interference cancellation assistance information includes:
acquiring, by the serving cell, information on the selected channel from the neighbor interfering cell; and
generating, by the serving cell, the interference cancellation assistance information based on the acquired information.

5. The method of claim 1, wherein if the downlink timing offset is zero or a unit of a subframe, the channel which is subjected to the interference cancellation is a control channel of the neighbor interfering cell that exerts interference to the control channel of the serving cell.

6. The method of claim 1, wherein if the downlink timing offset corresponds to five to six symbols and the control channel of the serving cell is transmitted on two symbols, the channel which is subjected to the interference cancellation is at least one of a Primary Synchronization Signal (PSS), a Secondary Synchronization Signal (SSS), an extended Physical Downlink Control Channel (e-PDCCH) and a Physical Downlink Shared Channel (PDSCH) of the neighbor interfering cell that exerts interference to the control channel of the serving cell.

7. The method of claim 1, wherein if the downlink timing offset corresponds to seven to ten symbols and the control channel of the serving cell is transmitted on two symbols, the channel which is subjected to the interference cancellation is at least one of a PBCH, an e-PDCCH and a PDSCH of the neighbor interfering cell that exerts interference to the control channel of the serving cell.

8. The method of claim 1, wherein the interference cancellation assistance information further includes at least one of system bandwidth information, scrambling code seed, transmission mode, System Frame Number (SFN) offset and the downlink timing offset.

9. The method of claim 1, wherein the interference cancellation assistance information further includes information on common search space for a neighbor user equipment that belongs to the neighbor interfering cell.

10. A serving base station for transmitting assistance information for interference cancellation for a user equipment, the serving base station comprising:
a processor configured to:
determine a downlink timing offset with a neighbor interfering cell,
select a channel which is subjected to an interference cancellation among channels of the neighbor interfering cell based on how much the downlink timing offset is,
wherein the channel is selected in consideration of whether the channel interferes with a control channel of the serving base station, and
generate interference cancellation assistance information for the selected channel; and
a radio frequency (RF) unit configured to transmit the interference cancellation assistance information for the selected channel to the user equipment,
wherein the interference cancellation assistance information includes information on a number of transmission antennas of the neighbor interfering cell that causes interference and an Evolved Universal Terrestrial Radio Access (E-UTRA) Absolute Radio Frequency Channel Number (EARFCN).

11. The serving base station of claim 10, wherein the control channel includes at least one of a Physical Downlink Control Channel (PDCCH), a Physical Control Format Indicator Channel (PCFICH) and a Physical Hybrid Automatic Repeat Request (HARQ) Indicator Channel (PHICH).

12. The serving base station of claim 10, wherein the processor determines the downlink timing offset by exchanging information on the downlink timing offset with the neighbor interfering cell.

13. The serving base station of claim 10, wherein the processor acquires information on the selected channel from the neighbor interfering cell and generates the interference cancellation assistance information based on the acquired information.

* * * * *